(12) United States Patent
Abad et al.

(10) Patent No.: US 7,858,561 B2
(45) Date of Patent: Dec. 28, 2010

(54) DEGRADABLE POLYMERS FOR WELLBORE FLUIDS AND PROCESSES

(75) Inventors: Carlos Abad, Richmond, TX (US); Kay Robinson, Milton (GB); Trevor Hughes, Cambridge (GB)

(73) Assignee: Schlumberger Technology Corporation, Cambridge, MA (US)

( * ) Notice: Subject to any disclaimer, the term of this patent is extended or adjusted under 35 U.S.C. 154(b) by 376 days.

(21) Appl. No.: 11/794,923

(22) PCT Filed: Jan. 11, 2006

(86) PCT No.: PCT/GB2006/000089

§ 371 (c)(1),
(2), (4) Date: Apr. 14, 2008

(87) PCT Pub. No.: WO2006/075154

PCT Pub. Date: Jul. 20, 2006

(65) Prior Publication Data

US 2009/0075845 A1    Mar. 19, 2009

(30) Foreign Application Priority Data

Jan. 11, 2005   (GB)   ................... 0500432.0

(51) Int. Cl.
*C09K 8/60* (2006.01)
*C09K 8/22* (2006.01)
*E21B 43/26* (2006.01)
(52) U.S. Cl. ............. 507/219; 507/117; 166/308.1
(58) Field of Classification Search ........... 507/117, 507/219; 166/308.1
See application file for complete search history.

(56) References Cited

U.S. PATENT DOCUMENTS

| 4,202,795 A | 5/1980 | Burnham et al. |
| 4,506,734 A | 3/1985 | Nolte |
| 4,683,068 A | 7/1987 | Kucera |
| 4,741,401 A | 5/1988 | Walles et al. |
| 4,770,796 A | 9/1988 | Jacobs |
| 4,845,035 A | 7/1989 | Fanta et al. |
| 4,848,467 A | 7/1989 | Cantu et al. |
| 5,036,919 A | 8/1991 | Thomas et al. |

(Continued)

FOREIGN PATENT DOCUMENTS

EP    0 534 639 A1    3/1993

(Continued)

OTHER PUBLICATIONS

Conway et al: "Chemical model for the rheological behavior of crosslinked fluid systems", Society of Petroleum Engineers, Feb. 1983 (paper first presented at the SPE Annual Technical Conference and Exhibition, Dallas, Sep. 21-24, 1980, SPE 9334).

(Continued)

*Primary Examiner*—Timothy J. Kugel
*Assistant Examiner*—Aiqun Li
(74) *Attorney, Agent, or Firm*—Vincent Loccisano; James McAleenan; Brigid Laffey

(57) ABSTRACT

A viscosifying agent for wellbore fluids is described including a polymer polymerized using at least two pre-polymers "A" and "B", the polymer being capable of essentially fully degrading into soluble fragments after the initiation of a breaking process.

26 Claims, 10 Drawing Sheets

U.S. PATENT DOCUMENTS

| | | | |
|---|---|---|---|
| 5,103,905 | A | 4/1992 | Brannon et al. |
| 5,191,016 | A | 3/1993 | Yalpani |
| 5,247,013 | A | 9/1993 | Shinoda et al. |
| 5,247,995 | A | 9/1993 | Tjon-Joe-Pin et al. |
| 5,304,620 | A | 4/1994 | Holtmyer et al. |
| 5,310,865 | A | 5/1994 | Enomoto et al. |
| 5,330,005 | A | 7/1994 | Card et al. |
| 5,439,057 | A | 8/1995 | Weaver et al. |
| 5,566,759 | A | 10/1996 | Tjon-Joe-Pin et al. |
| 5,585,333 | A * | 12/1996 | Dahl et al. .................. 507/103 |
| 5,591,700 | A | 1/1997 | Harris et al. |
| 5,604,186 | A | 2/1997 | Hunt et al. |
| 5,680,900 | A | 10/1997 | Nguyen et al. |
| 5,806,597 | A | 9/1998 | Tjon-Joe-Pin et al. |
| 5,817,728 | A | 10/1998 | Higuchi et al. |
| 5,948,735 | A | 9/1999 | Newlove et al. |
| 6,017,855 | A | 1/2000 | Dawson et al. |
| 6,143,698 | A | 11/2000 | Murphey et al. |
| 6,162,766 | A | 12/2000 | Muir et al. |
| 6,221,997 | B1 | 4/2001 | Woodhouse et al. |
| 6,225,262 | B1 | 5/2001 | Irwin et al. |
| 6,242,390 | B1 | 6/2001 | Mitchell et al. |
| 6,258,755 | B1 | 7/2001 | House et al. |
| 6,277,792 | B1 | 8/2001 | House |
| 6,291,404 | B2 | 9/2001 | House |
| 6,357,527 | B1 | 3/2002 | Norman et al. |
| 6,358,559 | B1 | 3/2002 | Hacker et al. |
| 6,358,889 | B2 | 3/2002 | Waggenspack et al. |
| 6,488,091 | B1 | 12/2002 | Weaver et al. |
| 6,579,947 | B2 | 6/2003 | Heitz et al. |
| 6,599,863 | B1 | 7/2003 | Palmer et al. |
| 2001/0016562 | A1 | 8/2001 | Muir et al. |
| 2002/0098987 | A1 | 7/2002 | House et al. |
| 2002/0115814 | A1 | 8/2002 | Woodhouse et al. |
| 2002/0131951 | A1 | 9/2002 | Langer et al. |
| 2002/0183418 | A1 | 12/2002 | Rosen |
| 2003/0060374 | A1 | 3/2003 | Cooke, Jr. |
| 2003/0153467 | A1 | 8/2003 | Cowan et al. |
| 2003/0215395 | A1 | 11/2003 | Yu et al. |
| 2004/0182575 | A1 | 9/2004 | Reddy et al. |
| 2005/0215438 | A1 | 9/2005 | Prud'homme et al. |
| 2006/0258544 | A1 * | 11/2006 | Saini .......................... 507/219 |

FOREIGN PATENT DOCUMENTS

| | | |
|---|---|---|
| GB | 2 145 422 A | 3/1985 |
| GB | 2 279 384 B | 8/1996 |
| GB | 2 322 865 A | 9/1998 |
| WO | WO 00/49272 A1 | 8/2000 |
| WO | WO 01/34939 A1 | 5/2001 |
| WO | WO 02/070861 A1 | 9/2002 |
| WO | WO 2005/095539 A1 | 10/2005 |

OTHER PUBLICATIONS

Gulbis et al: "Fracturing fluid chemistry and proppants", Reservoir stimulation, third edition, chapter 7, Economides and Nolte (editors), John Wiley & Sons Ltd, Chichester 2000.

McCormick et al: "Solution studies of cellulose in lithium chloride and N,N-dimethylacetamide", Macromolecules 1985, vol. 18, pp. 2394-2401.

Stockmayer: "Molecular distribution in condensation polymers", Journal of Polymer Science, vol. 9, No. 1, 1952, pp. 69-71.

Riggle: "Moving towards consensus on degradable plastics", BioCycle, vol. 39, No. 3, 1998, pp. 64-70.

Yalpani: "Synthesis of new carbohydrate polymers, polysaccharide analogues and conjugates", Polysaccharides. Syntheses, modifications and structure/property relations, Studies in organic chemistry 36, Elsevier Science Publishers B.V., Amsterdam 1988, Chapter 5, pp. 142-189.

* cited by examiner

DEGRADABLE POLYMERS FOR WELLBORE FLUIDS AND PROCESSES

This invention relates to wellbore fluids and in particular, but not limited to, fracturing fluids using degradable polymers as viscosifying agents.

CROSS-REFERENCE TO RELATED APPLICATIONS

This application is a national phase application (371) of PCT/GB2006/000089, entitled DEGRADABLE POLYMERS FOR WELLBORE FLUIDS AND PROCESSES, filed on Jan. 11, 2006 and claims the benefits of priority from United Kingdom patent application GB0500432.0, entitled DEGRADABLE POLYMERS FOR WELLBORE FLUIDS AND PROCESSES, filed on Jan. 11, 2005, which are both commonly assigned to assignee of the present invention and hereby incorporated by reference in their entirety.

BACKGROUND OF THE INVENTION

Oil and gas are produced from porous reservoirs by drilling wells into the formation, and using a pressure gradient to transport the hydrocarbons to the surface. This pressure gradient is normally achieved by means of pumps, which are required for situations where the reservoir pressure is not high enough to overcome the hydrostatic pressure between the reservoir depth and the surface.

Hydraulic fracturing is a term applied to a variety of techniques used to stimulate the production of oil, gas and other fluids from subterranean formations by means of increasing the permeability or conductivity thereof. In hydraulic fracturing, a suitable fracturing fluid is introduced into a subterranean formation through a wellbore under conditions of flow rate and pressure which are at least sufficient to cause the formation to break and to create and extend a fracture into the desired part of the formation. The fracturing fluid carries with it a proppant (e.g. sand, bauxite, etc.), transported into the fracture to create a high permeability path, and to prevent complete closure of the newly opened formation once the pressure gradient is reversed for production.

A fracturing fluid must be carefully designed to meet the rheological specifications imposed by its required performance. The fracturing fluid must have a sufficiently high viscosity to create and propagate the fracture through the rock, and to maintain the proppant in suspension as the fracturing fluid flows into the fracture. Very high viscosities are not advisable because an excessive pressure drop can be generated due to friction, which results in unacceptable horsepower pumping requirements. After the pressure is released and the formation has closed on to the newly placed proppant, the ideal fracturing fluid should revert to a low viscosity fluid which can be easily removed from the propped fracture to facilitate a high production rate.

In the early days of hydraulic fracturing, oil based fluids were formulated. Other oil containing fluids have been recently disclosed. Most fracturing fluids used nowadays are aqueous-based liquids, which have been either gelled or foamed. Examples of such viscosifying fluids are: i) viscoelastic surfactants (VES) ii) water soluble natural polymers; iii) water soluble or dispersible synthetic polymers; iv) polymer mixtures; and v) VES and polymer mixtures. A good review of the available technologies and additives commonly used in fracturing formulations can be found in Economides/Nolte (Eds.) "Reservoir Stimulation", Third edition (2000), Chapter 7.

Viscoelastic surfactants form long worm-like micelles that entangle providing the fluid with the adequate rheological properties. Their viscosity is readily reduced by contact with oil or with organic solvents, and thus VES based fluids show a high degree of clean-up from the propped fracture.

Polymeric fracturing fluids form a "filter cake" at the wall of the fracture preventing the viscous fluid from excessive, water depletion. Most frequently, the polymeric gelling agent of choice is a water-soluble polysaccharide. These water-soluble polysaccharides form a known class of compounds that include a variety of natural gums as well as certain cellulosic derivatives that have been rendered hydratable by virtue of hydrophilic substituents chemically attached to the cellulose backbone. Such water-soluble polysaccharides are, amongst others, galactomannan gums; glucomannan gums, cellulose derivatives, xanthan gum and their chemically modified derivatives. Such water-soluble polysaccharides have a recognized capacity to thicken aqueous liquids. Particularly for low temperature wells, the thickened aqueous liquid has sufficient viscosity to carry the proppant during the fracturing process. In other instances, particularly at higher temperatures, it is necessary to cross-link the polysaccharide in order to form a gel having sufficient strength and viscosity to create a propped fracture. A number of cross-linkers have been developed to achieve the cross-linking, among which the most frequently used cross-linker species are borate, $B(OH)_4^-$ and complexes of $Ti(IV)$, $Zr(IV)$ and $Al(III)$.

One of the first polymers used to viscosify water for fracturing applications was guar gum, a long chain, high molecular weight galactomannan obtained from the endosperm of the 'Cyamopsis Tetragonalobus' plant, grown mainly in Pakistan and India and more recently in USA. Guar gum is a widely available, reasonably low priced raw material that requires little processing and therefore is one of the preferred options in the field. When required, guar gum can be cross-linked with Borate, Titanate, and Zirconate through the cis hydroxyl groups present on the mannose backbone of the polymer. Delayed cross-linkers, as well as polymer stabilizers or suspended water-insoluble, meltable or degradable polymers find common use in guar based fracturing fluid formulations. Methods to optimize the temperature stability of the fracturing fluids involving pH adjustment to maximize cationic charge density have also been disclosed.

A problem experienced when using gelled and cross-linked polysaccharide fracturing fluids is the breaking and clean-up of such fluids after the fracture has closed. The cross-linked polymer gel remaining in the propped fracture is often very difficult to remove and so is the filter cake. The breaking of such polymeric fracturing fluids has commonly been accomplished by adding a breaker component such as an encapsulated breaker that is released as the fracture closes.

U.S. Pat. No. 5,036,919 describes a method consisting of pumping two polymeric fracturing fluids differing in gel strength: a first fluid with a higher gel strength to form the filter cake and a second fluid more prone to degrade to generate the proppant pack. Breakers such as oxidizers, redox agents, enzymes and acid release agents that attack the acetal linkages in the polysaccharide polymer backbone have been used more or less successfully to improve fracture conductivity. Patent WO 01/34939 extensively discusses some of the different systems known in the field.

Several other breaker systems have been disclosed: breakers encapsulated in a surfactant at room temperature but soluble at formation temperature; delayed breaker pellets produced by combining a breaker with a hydratable gelling agent; breakers introduced within hollow or porous crushable glass, ceramics, plastics or gel beads; breakers coated by brittle polymers which release the breaker upon closure of the fracture; breakers that coordinate with the cross-linker ion, preventing its reaction with the polysaccharide; encapsulated breaker slurries, comprising a breaker enclosed within a coating, a high flash point solvent and a suspending agent; breakers encapsulated by a hydrolytically degradable polymer coating; breakers encapsulated in permeable enclosures to allow the migration of the breaker into the fracturing fluid; oil degradable encapsulated breaker particulates aiming to break hydrocarbon liquid gels; delayed breakers and combinations of delayed and non delayed breakers. Enzyme breakers disclosed in the literature are: hydrolase enzyme breakers pumped together with the polymeric fracturing fluid; polymer specific enzyme breakers, designed to selectively degrade the filter cake; enzyme-polymer complexes that migrate with the polymer; encapsulated enzyme breakers. Breakers using bromine or bromate generating agents specifically designed to degrade the filter cakes formed whilst drilling can also find application in degrading fracturing fluid filter cakes.

The application of many of the disclosed breaker systems can be limited by unfavorable downhole conditions (mainly temperature) and economic factors associated with the methods of protection required to prevent premature viscosity degradation. Moreover, the breaking of conventional polysaccharide polymers and their chemically modified derivatives by means of enzyme, acid or oxidizer breakers can often result in insoluble residues that do not allow optimum fracture conductivity to be achieved.

The water solubility of galactomannans depends on the ratio and distribution of the galactose side chains relative to the mannose backbone. Even though guar gum's mannose to galactose ratio M/G (varying between 1.6 and 1.8) renders it the most water soluble galactomannan, the formation of insoluble residues with higher M/G ratio can arise from the application of non-specific breakers due to the different rate of hydrolysis of side chains and polysaccharide backbone.

Hydroxypropyl guar (HPG), a common chemically modified derivative of guar with improved thermally stability and lower insoluble impurities, was proposed as a potential alternative to minimize damage caused by guar fluids. However, further studies have demonstrated that cross-linked guar and HPG fluids cause approximately the same degree of damage to the formation.

An important aspect of viscosifying agents is the effect of polymer conformation and molecular weight on viscosity. The ability of a polymer to viscosify a dilute solution is normally, evaluated by measuring its intrinsic viscosity, $[\eta]$. The relationship between molecular weight, M, and intrinsic viscosity, $[\eta]$, can be described by the Mark-Houwink-Sakurada equation, $[\eta]=K M^a$, where the exponent a gives an indication of how close the polymer conformation in solution is to that of a pure random coil.

For randomly coiled polymers the intrinsic viscosity varies with the polymer coil dimensions (volume $<Rg^2>^{3/2}$ and molecular weight M) according to the well known Flory-Fox equation, $([\eta]=\phi<Rg^2>^{3/2}/M)$, where $\phi$ is a constant. Combining the Mark-Houwink-Sakurada and Flory-Fox equations one can predict the change of the radius of gyration $<Rg^2>^{1/2}$ with molecular weight.

It is commonly accepted that the rheological behaviour of polysaccharides and their hydrophilic or slightly hydrophobic modifications follows a master curve when plotted as log $\eta$ versus log $c^*[\eta]$ where $\eta$ is the viscosity and $[\eta]$ is the intrinsic viscosity and $c^*[\eta]$ being defined as the dimensionless coil overlap parameter. This plot can be approximated by two straight lines with a slope close to 1.4 at low concentrations and close to 5.0 at high concentrations. The two straight lines cross at a given point defining $[\eta]^*C^*$ where $C^*$ is the overlap concentration. The change in slope defines a transition between the dilute concentration regime where the polymer molecules do not interact with each other, and the semi-dilute regime where the molecules interact with each other and entangle resulting in higher viscosity. The overlap concentration $C^*$ is close to the lowest polymer concentration which can be cross-linked to form a space filling gel.

An inverse proportionality rule between $C^*$ and $[\eta]$ has been reported ($C^*=C'/[\eta]$, where $C'$ is in the range 3.4 to 4 for random coiled polymers. This links the minimum concentration required to form a space filling cross-linked gel ($C^*$) with the molecular weight of the polymer through a universal constant $C'$ and the Mark-Houwink-Sakurada equation $[\eta]=KM^a$ where K and a depend on polymer-solvent interactions, pressure and temperature.

In a cross-linked polymer gel, the viscosity and gel strength are mainly controlled by a combination of polymer concentration, intrinsic viscosity and cross-link density. High molecular weight polymers can form adequate fracturing viscosities at lower concentrations than their low molecular weight counterparts. The use of high molecular weight polymers reduces $C^*$ and therefore the minimum polymer loading required to form a space-filling gel. On the other hand, such high molecular weight polymers require very efficient breakers to reduce viscosity for optimum fracture clean-up. In contrast, the use of lower molecular weight polymers requires a higher polymer loading for cross-linking but a lower degree of breaking for clean-up.

GB patent application GB-2322865 describes methods for cross-linking polymers below an overlap concentration $C^*$ using extended cross-linkers. U.S. Pat. No. 6,017,855 claims to have decreased the $C^*$ of a CMG (darboxymethyl guar) and CMHPG (carboxymethyl hydroxypropyl guar) to values as low as 0.06% by weight, resulting in the potential, for cross-linked gels with low polymer loading. U.S. Pat. No. 4,683,068 describes a method to crosslink hydroxypropyl guar of low molecular weight (200-300 KDa).

U.S. Pat. No. 6,488,091 ("the '091 patent") discloses a method to use borate cross-linked, low molecular weight, depolymerized guar derivatives that do not require the use of internal breakers; a so-called "self cleaning" fluid. This patent claims an improved method to treat formations by preparing an aqueous fracturing fluid by cross-linking a "substantially fully hydrated depolymerized polymer" with a cross-linking agent. In the patent, slightly poorer permeability results are obtained for a treatment using 0.3% of borate cross-linked guar broken with activated sodium chlorite when compared to a treatment without breakers using 1.49 wt % depolymerized polymer. The molecular weight of guar is at least 2000 KDa while the molecular weight of a depolymerized polymer may be about 100 KDa to 250 KDa. In practice, the use of such a low molecular weight polymer may require high loadings (as much as five times more than that for raw guar or HPG) to obtain a space-filling cross-linked gel.

U.S. Pat. No. 6,579,947 discloses a low molecular weight, low damaging hydraulic fracturing fluid aimed at high temperature formations, comprising a purely synthetic pre-polymer copolymer containing one water soluble pre-polymer and one hydrophobic pre-polymer. However, no descriptions of the cleaning procedures, the required agents nor the retained permeability levels are disclosed.

Degradable and biodegradable polymers have been extensively proposed to replace less environmentally friendly polymers for several applications ranging from fibers, films, injection molding, extrusion or below molding thermoplastics, to medical stitches or biocompatible implants. The most commonly used and commercially successful degradable polymers found in the literature contain at least one of the following groups or polymers: ester, acetal, sulfide, peptide, amide, polyhydroxy acids, polyesters, polylactones, polyvinyl alcohol, polypeptides, polyester amides, polysaccharides or polysulfides.

U.S. Patent Application No. 2001/0016562 and U.S. Pat. No. 6,162,766 disclose the use of a degradable polymer as a coating to encapsulate breakers for use in fracturing applications. WO patent 00/49272 describes the use of a degradable polymer in the form of fibres as a proppant or proppant support additive aiming to increase the gel strength (storage modulus) of a fracturing fluid by means of a pure buoyancy mechanism. U.S. Pat. No. 6,599,863 describes the use of a polymeric breaker in the form of fibers and/or platelets in a fracturing formulation. U.S. Pat. No. 5,330,005 describes the use of such organic fibers as stabilizing agents to eliminate proppant or formation fines flowback. U.S. Pat. No. 4,848,467 describes the use of a degradable thermoplastic polymeric fiber as a fluid loss additive.

U.S. Patent Application No. 2003/0060374 describes the use of a thermoplastic degradable polymer to improve conventional hydraulic fracturing and sand control processes for very small fractures. This process requires at least 50 wt % of the composition to be the thermoplastic degradable polymer. U.S. Pat. No. 6,277,792 discloses a method to compatibilize chitosan in aqueous acidic solutions by means of its functionalization with a polysaccharide. U.S. Pat. No. 6,358,559 discloses a drilling fluid comprising an alkaline aqueous liquid, chitosan, an anhydride and, optionally, an aldehyde. U.S. Pat. No. 6,291,404 discloses a drilling fluid comprising an alkaline aqueous fluid, chitosan, an amine reactive acid and an aldehyde. U.S. Pat. No. 6,258,755 discloses a method to produce pseudoplastic fluids useful as drilling fluids, completion fluids or filter cake removing fluids by solubilizing chitosan at pH above 7 by incorporating into the fluid aldoses or oligosaccharides. U.S. Patent Applications Nos. 2002/0098987 and 2003/0153467 disclose a diacid anhydride modification of chitosan to be used as drilling fluid.

Methods to synthesize such degradable polymers have been disclosed. A typical method consists of the melt polymerization of the corresponding monomers. U.S. Pat. No. 5,310,865 discloses such a process to produce a thermoplastic polyhydroxyester. Other methods to synthesize biocompatible polymers involve grafting polymers (degradable or not) onto polysaccharide backbones. A process to produce such a polymer involves the use of ceric ion salts (e.g. ammonium cerium (IV) nitrate) to selectively oxidize the polysaccharide backbone at the carbons of the cis-hydroxy groups available in several polysaccharide types. Polymers produced by this method have found application in the oilfield as fluid loss additives.

In summary, most of the existing fracturing fluids rely on the use of conventional breaker technologies which can result in inefficient clean-up. The use of alternative technologies that do not require aggressive breakers, such as fracturing fluids comprising depolymerized polysaccharides, results in very high polymer loadings that are less cost effective. The use of commercially available degradable polymers such as polylactones or polyhydroxyesters encounters two major problems; the lack of water solubility and their high cost compared to typical raw polysaccharides or their chemically modified derivatives. Despite prior efforts undertaken by several researchers to produce alternative solutions to the damage problem, there is still a need to develop new polymer based fracturing fluids that can form gels at low concentrations and whose degradation creates a low viscosity non-damaging fluid due to processes which are less sensitive to breaker type, diffusion and reservoir conditions, and incorporating processes which can be carried out in a controlled way.

SUMMARY OF THE INVENTION

In embodiments of the current invention a new type of wellbore service fluid is described. In an embodiment of the present invention, the fluid may comprise a solvent (aqueous or organic) and a degradable polymer that is soluble in the solvent and may viscosity the solvent at low concentrations. In a controlled way the viscosity of the fluid may be reduced in response to internal or external triggers, and this property may be beneficial in a number of different applications of the fluid. For example, the invention may find application in the areas of aqueous or organic fracturing fluids, drilling fluids, diverting fluids, gravel packing fluids, fluid loss control pills, etc.

Following standard definitions, the disclosed polymer formulation can be described as a polymer composed of pre-polymers "A" and "B" linked to each other with or without the presence of bridging pre-polymer "C". It should be noted that the polymers of this invention may be produced using a polymerization reaction, such as addition and condensation reactions, known to yield purely organic polymers and copolymers, which have been discussed in the literature ("Organic Chemistry of Synthetic High Polymers", R. W. Lenz, Willey Interscience, New York, 1967, "Principles of Polymerization, $3^{rd}$ Edition", G. Odian, John Willey & Sons, New York, 1991).

The polymers of this invention are thus distinguishable from known cross-linked compositions. Common metal cross-linkers for polysaccharide derivatives used in the field are Boron, Zirconium, Titanium, Chromium, or Aluminium salts. Organo-metallic extended cross-linkers have also been proposed. For all these, metallic and organo-metallic, the cross-linking occurs mainly by acid-base reactions. The metal atom of the cross-linker is generally the central point of four branches within the cross-link site. The polymers of the present invention lack such a metal-containing cross-link site. On the other hand, the known purely organic cross-linkers with multiple bonds are not designed to incorporate degradability.

In certain embodiments of the present invention, the polymer is linear, whereby the link between the pre-polymers "A" and "B" is established via terminal groups on either "A" or "B" or on both "A" and "B". Hence, in certain aspects of the present invention, the degradable "B" pre-polymer may contain at least two moieties, which may be two end-reacting moieties, so as to obtain as linear co-polymers as possible; therefore all the "B" pre-polymer may be listed as "di-terminated".

Other possible structures covered by the current invention are branched polymers, hyper-branched polymers and hyper-branched colloidal micro-networks. The polymer, in accordance with embodiments of the present invention, may provide that at least one of the chemical bonds present in the "B" subchain, which is formed by the polymerization of "A" and "B", may be degraded and that this selective degradation may be triggered at an appropriate time without substantially degrading the bonds in the "A" structures. In certain aspects, the B section may contain more than one, and more preferably more than two degradable bonds. In certain embodiments of the present invention, the degradable bonds may be ester or amide bonds.

There is an advantage in reducing the degradable "B" subchain into small fragments in that the overlap behaviour of the remaining fragments is then dominated by the concentration of "A" fragments. Thus if the $(A-B)_n$ copolymer is used at a concentration near its overlap concentration $C^*_{(A-B)n}$, and if the "B" subchains are reduced to small fragments, the concentration of the "A" fragments will be below its overlap concentration $C^*_A$. Variants of the invention are described where the "B" subchains do not contain any cleavable bonds, but the "B-A" and/or "B-C" links are degradable. The presence of such degradable or cleavable bonds in the "B" subchains in predetermined positions in the copolymer structure enables selective degradation of the polymer releasing essentially undegraded "A" fragments or essentially undegraded "A" fragments linked to fragments of "B".

In another variant of the invention the B subchains contain degradable bonds at the "B-A" and/or "B-C" links in addition to one and more degradable links in its backbone structure.

As an overall effect of embodiments of the present invention, the novel polymers may be capable of forming a space-filling gel, hence are above their overlap concentration C* at the point of application. After degradation, however, the concentration of the fragments may fall below their respective C* making it impossible to from a space-filling gel. The term "space-filling" gel is used to exclude spurious formations of locally confined gels from the assessment of the performance of the novel polymers.

This feature of "selective degradation" is not present in any of the polymeric fluids known in the oilfield art. The feature of selective degradation into undegraded "A" fragments provides various advantages for different applications. The polymeric fluids currently used tend to degrade (with time or when triggered by breakers) at random positions in the polymer chain, which renders the control and the extent of the molecular weight decrease very difficult under the relatively variable conditions of the oilfield operations. This may lead to insoluble residues, which are undesirable in certain applications.

Another feature of the polymer described herein is its ability to produce higher viscosities (under the same conditions of temperature, shear and concentration) than the original pre-polymer molecules "A" and "B" independently. This can be used to reduce the polymer loading required to achieve a certain specified viscosity in a well treatment fluid. When degraded, the highly viscous polymer yields low molecular weight "A" and "B" fragments. Since the polymer loading required is low in the initial fluid, the concentration of these "A" and "B" fragments is also low after the treatment and degradation.

Moreover, ultrahigh molecular weight polymers $(A-B)_n$ or $(A-C-B-C-A)_n$ with very low overlap concentration C* can be used. Such copolymers may have a molecular weight in the region $2 \times 10^6$-$10^7$ Da or even above $10^7$ Da, resulting in respective overlap concentration (if the "A" pre-polymer was guar) in the range 0.17-0.06% respectively. Relative to the existing polymeric fluids, such as those based on guar with molecular weight around $2 \cdot 10^6$ Da, a higher upper temperature limit for linear (non cross-linked) ultrahigh molecular weight polymers of the invention can be realized. Alternatively, for even higher temperature applications, such copolymers can be cross-linked using the conventional metal containing cross-linkers.

In certain aspects, the pre-polymer molecules "A" that may be used in embodiments of this invention may be those that can be solubilized and remain soluble in their solvent (be it aqueous or organic) at typical fluid operating conditions (pressure and temperature). These structures may be chosen to be easily solubilized in the available base fluid, and may be appropriate to reduce the fluid viscosity as the degradable links of the "B" subchains cleave, allowing a low viscosity fluid to be formed.

The disclosed copolymer formed by the reaction of essentially non degradable pre-polymer molecules "A" with essentially degradable pre-polymer molecules "B" with or without the need of bridge pre-polymer molecules "C", can be synthesized and delivered by several methods: i) off-line in a chemical plant where the "A", "B" and potentially "C" pre-polymer are linked together by means of the appropriate chemical reaction(s) and the product is delivered to the field as a solid, a highly concentrated solution or a slurry; ii) the chemical reaction(s) to link "A", "B" and potentially "C" pre-polymer can also be carried out in a mixing tank shortly before pumping, or iii) "on the fly" mixing and reacting down-hole two or more streams of liquid containing the "A", "B" and potentially "C" pre-polymer separately.

"A", "B", and "C" pre-polymer are carefully selected in terms of chemical structure, molecular weight, and pre-polymer concentration per polymer molecule, because these parameters determine the final structure of the polymer (molecular weight and conformation in solution) and therefore its viscosity and subsequently its performance as a suitable wellbore fluid.

The molecular weight of the polymer can be predicted theoretically from the number of functional groups and the molecular weight of each pre-polymer and the conversion of the coupling reactions, as described by W. H. Stockmayer in J. Polym. Sci. 1952, 9, p 69. This method to estimate the molecular weight of the synthesized polymer can be very troublesome especially with regard to the accurate experimental determination of the number of functional groups and their conversion.

Analytical techniques such as Size Exclusion Chromatography (SEC) can be used to estimate the molecular weight of the polymer. The technique relies on either calibration versus standards of a very different nature to that of the produced polymer, or on the determination of the variation of the refractive index with concentration for light scattering detectors where dn/dc cannot be considered independent of molecular weight for polymers, such as the one described in this invention.

More empirically the molecular weight can be estimated, as previously discussed, for a polymer "A" with known K and a constants from the overlap concentration C* assuming that the copolymerization of "A" with "B" does not significantly change the Mark-Houwink-Sakurada constants. In this work this last method has been chosen for demonstrating the increase of molecular weight achieved when, for example, "A" and "B" are converted to $(A-B-)_n$.

The "A" pre-polymer in the degradable polymer may contain a significant number of repeat units. As the number of repeat units in "A" decreases, the number of "B" pre-polymers, or the molecular weight of the "B" pre-polymer required to build the desired molecular weight of the copolymer would need to increase, resulting in a more complicated synthetic process and adding undesirable costs to the product.

The most widely cited definitions for degradability are provided by the ASTM/ISR (American Society for Testing and Materials/Institute for Standard Research) and CEN (European Committee for Standardization). The ASTM definition is: "A material is called degradable with respect to specific environmental conditions if it undergoes a degradation to a specific extent within a given time measured by specific standard test methods." Based on the available definitions and the specific needs of the oilfield industry, the polymers that can be regarded as degradable or degrading are those whose degradation can be achieved at the selected "B" groups to such an extent that the "A" fragments are released in a state which is essentially unaffected by the degradation process and remain perfectly soluble.

Degradable polymers are hence those formed by coupling at least one essentially non-degradable pre-polymer "A" to at least one essentially degradable "B" pre-polymer containing preferably at least one, and more preferably at least two, of the following bonds: i) those pertaining to the group of covalent bonds that can be degraded by a hydrolytic mechanism by means of acids, encapsulated acids, acid precursors, bases, encapsulated bases or base precursors such as ester, sulfonic ester, thioester, amide, sulphonamide, acetal, hemiacetal, urea, urethane; ii) those pertaining to the group of chemical bonds that can be homolytically cleaved for example by means of heat/temperature or a redox reaction triggered by the release of a reducing agent such as peroxide, perester, percarbonate, persulphate, thiosulphate or dithionite; iii) those pertaining to the group of bonds, such as peptide, nucleic acids, glycosidic bonds, that can be enzymatically degraded by means of specific enzymes; and/or iv) combinations of two or more of the bonds described in i) through iii) that may be degraded by hydrolytic means, temperature means, redox means, enzymes and/or enzyme mixtures.

The "A" pre-polymer may be i) a functional synthetic polymer capable of reacting to couple to the "B" pre-polymer directly or through a "C" bridge group; ii) a modified synthetic polymer capable of further reacting to couple to the "B" pre-polymer directly or through a "C" bridge group by means of the introduction of reacting functionalities through the modification process; iii) a functional natural polymer capable of further reacting to couple to the "B" pre-polymer directly or through a "C" bridge group; iv) a modified functional natural polymer capable of further reacting to couple to the "B" pre-polymer directly or through a "C" bridge group; or v) a modified natural polymer capable of further reacting to couple to the "B" pre-polymer directly or through a "C" bridge group by means of the introduction of reacting functionalities through the modification process. In further aspects of the present invention, the "A" pre-polymer may be hydrophobically modified. Merely by way of example, the "A" pre-polymer may be hydrophobically modified to provide a boost for a given loading or concentration. Such hydrophobic modification of the "A" pre-polymer may be used in aspects of the present invention where the modification does not effect the solubility of the "A" pre-polymer after a polymer formed from the "A" and the "B" pre-polymers is degraded.

The "C" bridge can be any chemical structure of polymeric or non polymeric nature required to link the "A" pre-polymer to the "B" pre-polymer due to (i) the absence of a reactive chemical functional groups on either "A" and/or "B", (ii) the lack of appropriate mechanisms of reaction in the solvent of choice to react "A" and "B", (iii) the lack of appropriate reaction conditions in the solvent of choice to react "A" and "B" without damaging the degradable bonds present in "B" and/or without substantially reducing the molecular weight of "A" beyond that required to perform appropriately as an effective wellbore fluid, (iv) convenience of synthesis, or (v) convenience of use for a specific application.

In order to comprehensively describe the chemical structures covered by this application a description of the "A", "B" and "C" pre-polymer follows, linking the chemical reactions that can be used to obtain the described polymers to the functional groups involved in them.

In general, any functional group can be introduced into the structure of the "A" pre-polymer. This functional group will react with the "B" or "C" pre-polymer to produce the polymers of the invention. In synthetic polymers, it is relatively easy to introduce the desired reacting functionality during the polymerization process. In natural polymers, the variety of reacting groups present in the structures is scarce and in some cases new groups have to be introduced by intermediate modification reactions. Yalpani reviews in "Polysaccharides", Elsevier, 1988, pp 142-189 a series of potential modifications of polysaccharides in order to introduce functional groups, which have been carried out by various authors, and many of which have found industrial application. Use has been made of these chemical modifications to introduce the desired reactivity on the "A" pre-polymer of the copolymers disclosed.

If the fluid described in the current invention is to be used as a fracturing fluid, a method for using such new fluid is also herein disclosed. A fracturing fluid based on the fluid described above may comprise a solvent (aqueous or organic), the new degradable polymer soluble in the solvent, and any of the usual additives in fracturing fluids, namely brine, other soluble or insoluble polymers, surfactants, viscoelastic surfactants, proppant, cross-linker, extended cross-linkers, fluid loss additive, delayed cross-linkers, breakers, encapsulated breakers, etc.

In order to make the polymer disclosed an efficient fracturing fluid, the polymerization process has to allow the polymer to grow to a sufficiently high molecular weight, to result in a viscous liquid at the required concentration. The need for a "C" type of bridge may arise from the requirement to reduce the number of reacting moieties on the "A" pre-polymer which can react with the building molecules of the "B" pre-polymer, in order to minimize hyper-branching during the synthesis. The use of "C" bridge structures also effectively increases the number of potential synthetic routes to degradable polysaccharide copolymers. Additionally, the use of such "C" bridges can be used to improve the solvent solubility of the copolymer when "A" and/or "B" pre-polymer are poorly soluble.

In contrast to the polymeric fluids currently used in fracturing, the polymer of the invention can be selectively degraded to form low viscosity soluble degradation products, which can be easily removed by formation fluids to create a "clean" propped fracture. When the degradation process is not controlled or "selective", insoluble residues can impair fracture clean-up and this is a feature of many of the current polymeric fracturing fluids.

In the fracturing application, depending on the designed fracture size and pumping rate, a typical time at which the viscosity of the fluid needs to begin to decrease is in excess of the range 1-5 hours. Such a decrease in the fracturing fluid viscosity is appropriate at some time after the fracture has closed to form a propped fracture and during the backflow of formation fluids from the reservoir via the fracture to the wellbore. This decrease in viscosity will facilitate easier clean-up of the fracturing fluid from the propped fracture, thereby maximizing the production rate.

In addition to fracturing fluid applications other oilfield applications of embodiments of the present invention may be envisaged. These oilfield applications may include wellbore treatment processes—which may require the viscosity of the employed fluid to be high initially but, at a later time, to decrease at a rate appropriate to the intended process.

Other oilfield applications may include, but are not limited to, wellbore clean-out operations and temporary diversion operations, the latter including both injection of the temporarily viscous fluid into the formation or into a gravel pack. For example, in wellbore clean-out operations, a viscous fluid may be delivered into the wellbore via coiled tubing to remove unwanted solids from the wellbore; after recovery of the solid-laden fluid from the wellbore it may be beneficial to reduce the fluid viscosity in order to separate or recover said solids. In temporary diversion operations, it may be necessary to place the temporary viscous fluid in a certain zone(s) of the formation so that subsequently pumped fluids (e.g. acid formulations) are diverted to selectively stimulate other zones. If the zone into which the temporarily viscous fluid is placed contains valuable hydrocarbon, it is then beneficial to, at a later time, degrade the fluid thereby restoring production from that zone.

In another potential application, the temporarily viscous fluid can be used to form a temporary "chemical packer". Chemical packers have already been described in several patents, such as the UK application GB 2279384. The temporarily viscous fluid is pumped into the gravel pack with appropriate overflush and then the subsequently pumped permanent polymer gel can be placed into the zone requiring permeability reduction. Subsequently, the degraded temporarily viscous fluid can be easily removed to restore production from the non-target zones.

The polymer described in this patent can also find application as a fluid loss control fluid during multiple zone perforation processes, where it is necessary to avoid formation fluid flow into the wellbore from the recently created perforations, while new perforations are being shot.

Another potential application of the temporarily viscous fluid is in drilling fluids, including among other things, to facilitate the recycling of certain components. After the drilling fluid has been used to drill an interval, it might be advantageous to attempt to recycle the more valuable components such as the weighting agent(s). At this point, if the drilling fluid were built using a temporarily viscous polymeric formulation, such as that described in the present invention, an appropriate trigger could be used, at surface, to "break" the viscosity of the fluid so that the valuable solid components could be separated more easily and thereby recovered for reuse. Such a scenario could also apply to a temporarily viscous spacer fluid used to isolate the drilling fluid from a cement formulation during a cement displacing drilling fluid operation. Since both drilling fluid and cementing fluid formulations are typically alkaline, it is preferable that the degradable bonds in the applied copolymer are alkaline stable and therefore are subsequently triggered to degrade by changing the pH condition to acidic.

These and other features of the invention, preferred embodiments and variants thereof, possible applications and advantages will become appreciated and understood by those skilled in the art from the following detailed description and drawings.

DETAILED DESCRIPTION OF THE INVENTION

Figure 1A:
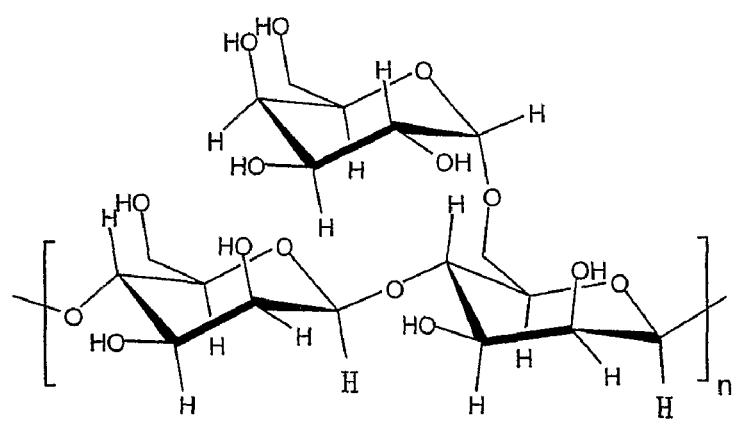
FIG. 1A illustrates the chemical structure of a compound that may be used in accordance with an embodiment of the present invention.

The following description of various embodiments of the present invention is merely exemplary in nature and is in no way intended to limit the invention, its application, or uses. In the following detailed description of the invention various examples of possible combinations of species of pre-polymers "A" and "B" are described together with "C" bridges, where required to link "A" and "B" pre-polymers. In the examples, the pre-polymers "A" and "B" are linked using the reacting groups to generate the degradable copolymers disclosed in this application.

Various examples are summarized below based on the functional groups of the "A" pre-polymer. Any specific functional group of the "A" pre-polymer may be combined with a variety of functional groups in the "B" pre-polymer, or, in cases where a linking group is used, in the "C" bridge section of the polymer.

The functional groups of the "A" pre-polymer are selected from hydroxy (—OH) groups, the amino (—NH$_2$) groups, the aldehyde or formyl (—CH=O) groups, epoxy groups, ester groups or amide (—CO—NH$_2$) groups. These groups link to the functional group of the "B" or "C" species.

The examples presented herein fall either into a category wherein the "B" pre-polymer includes an "inner" degradable links or wherein the link between the "A" and "B" pre-polymer itself is degradable. The latter link could be formed by a "C" type bridge section.

In cases where hydroxyl groups are present in the structure of the "A" pre-polymer they can react to produce carboxylic ester or sulfonic ester linkages with "B" or "C" pre-polymer containing any of the following reacting groups: i) carboxylic acid, ii) anhydride, iii) acyl halide, iv) ketene, v) ester, vi) amide, vii) sulfonic acid, viii) sulfonyl halide.

Examples of polymers containing hydroxyl groups that can be used as "A" pre-polymer are:

i) Polysaccharides containing chemically reactable primary and secondary hydroxy groups such as: naturally occurring galactomannans such as guar gum, carob or locust bean gum, tara gum; modified galactomannans such as hydroxypropyl guar, carboxymethyl guar, cationic guar, carboxymethyl hydroxypropyl guar and their hydrophobically modified counterparts; depolymerized galactomannans, depolymerized modified galactomannans, starch, depolymerized starch, xanthan gum, depolymerized xanthan gum, chitin, chitosan, depolymerized chitin, depolymerized chitosan; naturally occurring alginates, depolymerized alginates, diutan, depolymerized diutan and their hydrophobically modified counterparts; modified cellulosic derivatives such as carboxymethyl cellulose, hydroxyethyl cellulose, hydroxypropyl cellulose, depolymerized modified cellulosic derivatives, kappa-carrageenan, iota-carrageenan, lambda carrageenan, depolymerized carrageenan, arabinoxylan, depolymerized arabinoxylan, beta-glucan, depolymerized beta-glucan and their hydrophobically modified counterparts etc.

ii) Polysaccharides mentioned above grafted with polymers containing primary and secondary hydroxyl groups such as poly(vinyl alcohol) copolymers, poly(hydroxy-alkyl-(meth)acrylate) copolymers and the like.

iii) Synthetic water soluble polymers containing primary and secondary hydroxyl groups, such as poly(vinyl alcohol) copolymers with an intermediate degree of substitution, hydrophilic poly(hydroxy alkyl(meth)acrylate) copolymers.

iv) Synthetic organic solvent soluble polymers containing primary and secondary hydroxyl groups, such as poly(vinyl alcohol) copolymers with a low degree of substitution, hydrophobic poly(hydroxy alkyl(meth)acrylate) copolymers, poly(siloxanes), epoxy resins, dihydroxy-terminated poly(amides), dihydroxy-terminated poly(amines), dihydroxy-terminated poly(carbonates), dihydroxy-terminated poly(acetals).

v) Water-soluble proteins and polypeptides with hydroxyl containing amino acids such as threonine, tyrosine and serine or polypeptides modified to contain reactable hydroxyl groups such as, poly(vinyl alcohol) copolymers, poly(hydroxy-alkyl-(meth)acrylate) copolymers and the like.

The preferred industrial processes required for the production of such polymers comprising hydroxyl containing "A" pre-polymers might involve i) the solution of the "A" pre-polymer in a suitable solvent to carry out the co-polymerization, the co-polymerization in an slurry, or the co-polymerization in melt state ii) the use of an appropriate catalyst for the specific reaction and reaction media, iii) the removal of side products to displace chemical equilibria (water, short chain alcohols, acids, or amines), iv) the eventual isolation or transfer of the polymer to a more environmentally friendly solvent, slurry or solid state Examples of monomers or polymers containing groups that can be used as "B" pre-polymers to react with the hydroxyl-containing "A" groups listed above to yield degradable ester links between the "A" and "B" pre-polymers are: aliphatic or aromatic polyester; acid; polyacid; dibasic acid anhydride; polybasic acid halide; polybasic acid alkyl ester; polyamide; dibasic acid imide; dibasic acid bisimide; polybasic acid alkyl amide; poly(maleic anhydride) and copolymers; partially hydrolyzed poly(maleic anhydride) and copolymers; poly(styrenesulphonic acid).

In further examples, the hydroxyl groups present in the structure of the "A" pre-polymer can react to produce other bonds with "B" pre-polymers, which contain degradable links terminated in any of the following reacting groups: i) double bonds (to yield ether links), ii) aldehyde (to yield acetal links), iii) ketone (to yield acetal links), iv) epoxy (to yield β-hydroxy ether links), v) isocyanate (to yield urethane links).

Examples of polymers containing hydroxyl groups that can be used as "A" pre-polymers are any of those listed previously.

Examples of polymers terminated or containing any of the groups listed above that can be used to link degradable "B" pre-polymers to the "A" pre-polymers by means of their reaction with the hydroxyl groups of the "A" pre-polymers, are: aliphatic or aromatic polyester, polyamides, or structures containing perester, percarbonate, peroxide, persulphate, or azo links, that are di-terminated with isocyanates, double bonds, triple bonds, aldehydes, epoxys, or contain at least two ketone groups.

EXAMPLE 1

Depolymerised natural Guar LamGUM LV™ by Lamberti (Code G9) shown in FIG. 1A is used. The depolymerised natural Guar LamGUM LV™ "A" pre-polymer has only hydroxyl functional groups for reactions to couple it with the "B" pre-polymers.

The properties of the depolymerized guar G9 are:

| | |
|---|---|
| Intrinsic viscosity [η]: | 2.5 dL/g |
| Overlap concentration C*: | 1.6 wt % |
| Reduced overlap concentration [η] * C*: | 4.0 |
| Zero shear viscosity of a 0.5% solution: | 3 mPa s |
| Zero shear viscosity of a 1.0% solution: | 8 mPa s |

Figure 1B:
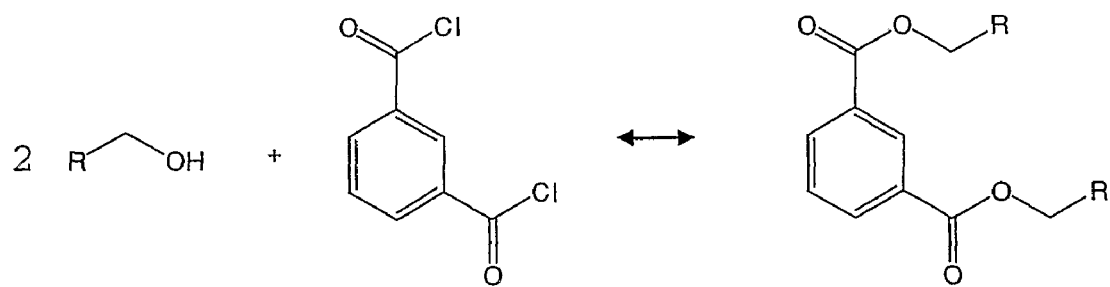
FIG. 1B illustrates a chemical reaction of the compound of FIG. 1A to prepare guar polyester copolymer gel with two ester degrading sites per each "B" sub-chain.

Since it is impossible to carry out any hydroxyl-related reactions in aqueous media, an organic solvent is used. The organic solvent is N,N dimethyl acetamide with lithium chloride, a well known organic solvent for polysaccharides. A stock solution of the "A" pre-polymer is prepared as follows: 1 g of the depolymerised natural Guar LamGUM LV™ and 1 g lithium chloride are dissolved in dimethyl acetamide (9 g) at 150° C. for 6 h. The pre-polymer molecule B, isophthaloyl chloride (0.3 g) is dissolved in the stock solution and stirred at 20° C. for 12 h. When fully dissolved the reaction of guar with the acyl chloride forms a polymer with degradable ester groups. A marked increase in viscosity can be observed when comparing the stock solution A of polymer G9 dissolved in N,N'dimethyl acetamide and lithium chloride, and the polymer of G9 formed after a reaction with isophthaloyl chloride as illustrated in the reaction of FIG. 1B, where R is the depolymerised natural Guar.

Figure 1C:
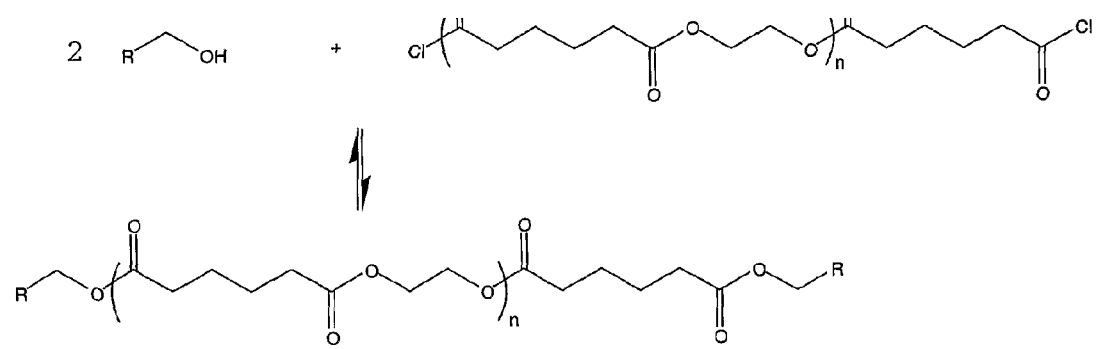
FIG. 1C illustrates a chemical reaction of the compound of FIG. 1A to prepare guar polyester copolymer gel with multiple ester degrading sites per each "B" sub-chain.
Figure 1D:
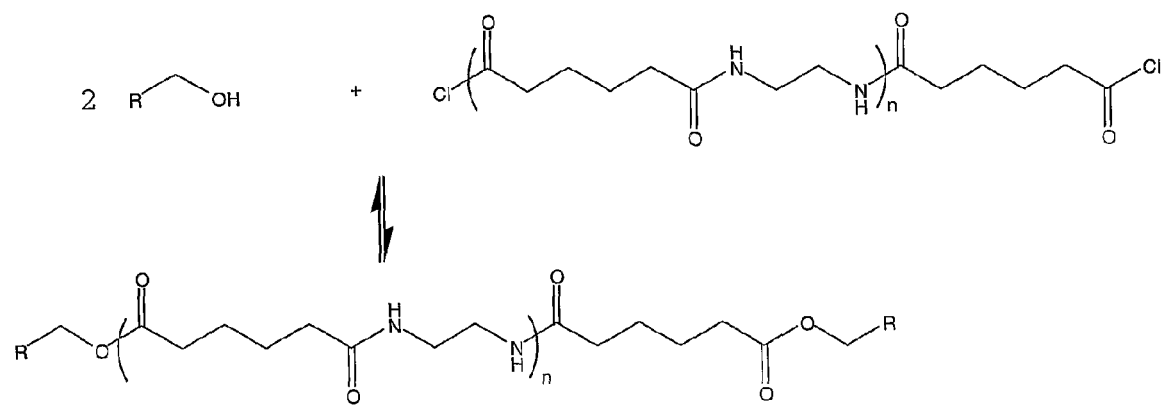
FIG. 1D illustrates a chemical reaction of the compound of FIG. 1A to prepare a guar polyester polyamide copolymer gel with multiple amide degrading sites per each "B" sub-chain.

The pre-polymer molecule of FIG. 1A can be used in further reactions to prepare polymers having a B sub-chain with multiple degradable bonds. In FIG. 1C, there is shown a reaction path for the preparation of a guar polyester copolymer gel with multiple ester degrading sites. In FIG. 1C, there is shown a reaction path for the preparation of a guar polyester polyamide copolymer gel with multiple amide degrading sites.

In place of depolymerised guar (e.g. LamGum LV™), the same approach as described above can be followed using higher molecular weight and raw guar.

EXAMPLE 2

Figure 2:
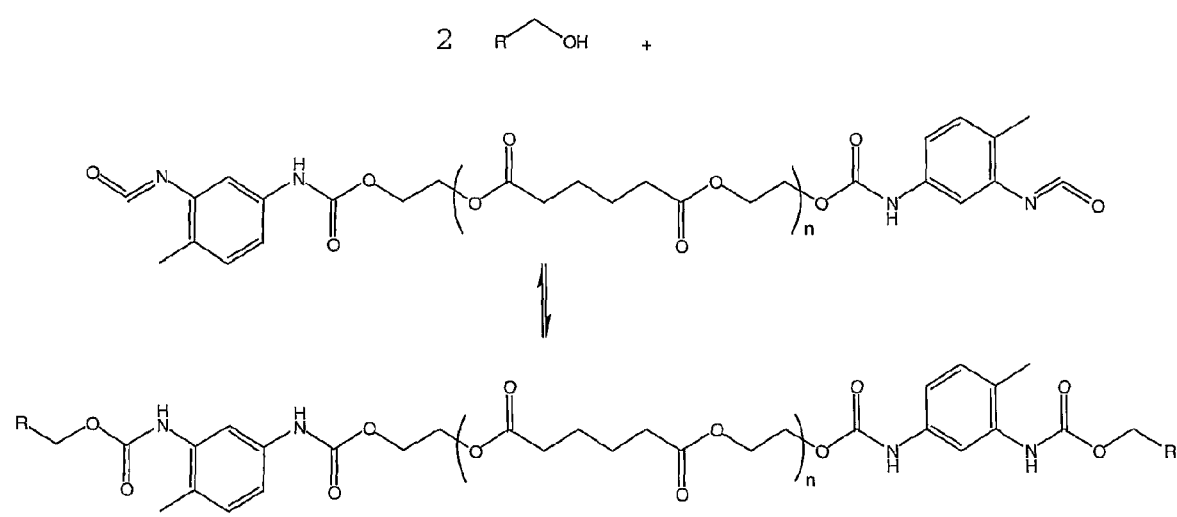
FIG. 2 illustrates a chemical reaction of the compound of FIG. 1A to prepare guar polyester polyurethane copolymer gel with multiple ester degrading sites per each "B" sub-chain.

This example illustrates a reaction with guar in organic media where hydroxyl groups react with isocyanates to form urethanes. The stock solution of Example 1 of depolymerised natural Guar LamGUM LV™, (Code G9) is used. Poly(ethyleneadipate) tolylene 2-4-diisocyanate (1 g) as "B" pre-polymer is dissolved in the stock solution and stirred at 20° C.

for 12 h. The reaction, as illustrated in FIG. 2, yields a high viscosity copolymer with degradable ester bonds.

EXAMPLE 3

In this example a copolymer gel is obtained by grafting an "A" pre-polymer with a "B" pre-polymer (poly(ethyleneglycol) bismethacrylate) yielding a copolymer containing several degradable ester links. The copolymer forms a high viscosity gel in an aqueous solvent.

Figure 3:
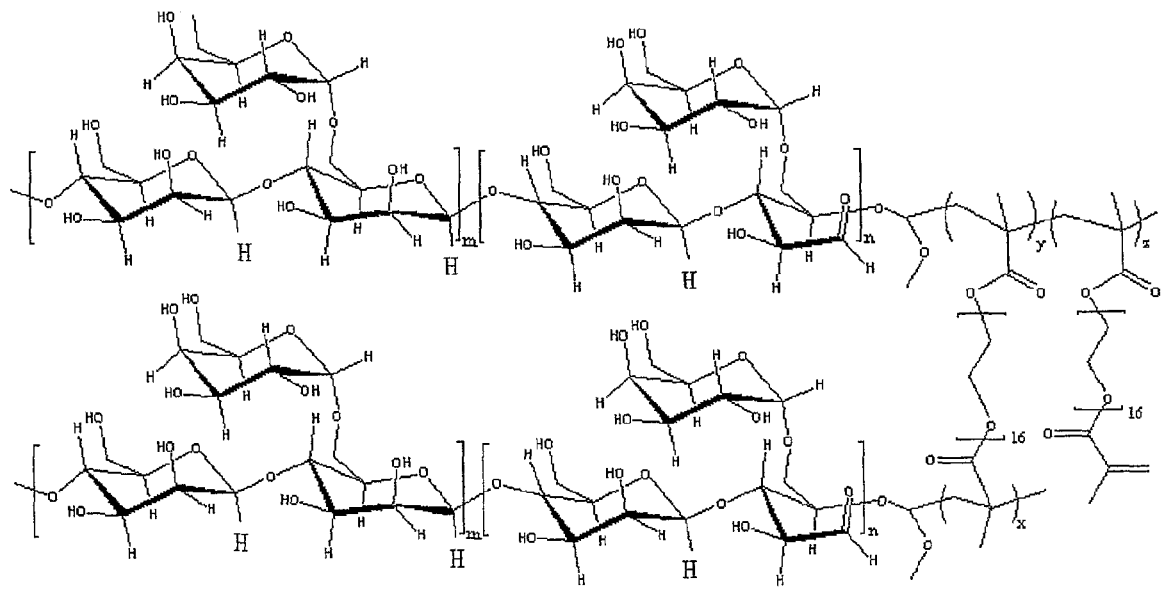
FIGS. 3 and 4 illustrate the chemical structure of further compounds that may be used in embodiments of the present invention.

To prepare the grafted polymer (Code G9-PEGDM), depolymerised natural Guar LamGUM LV™ (100 g of a 10% aqueous solution), poly(ethylene glycol) dimethacrylate (1 g, 10 wt % with respect to depolymerised guar), and acetic acid (10 mL) are dissolved in water (500 mL) and degassed for 1 h at 50° C. Ammonium cerium (IV) nitrate (1 g) is added and the solution is stirred at 50° C. for a further 3 h. The polymer is precipitated 3 times in acetone to remove any unreacted monomer or ungrafted poly(ethyleneglycol) dimethacrylate polymer. The result is a branched copolymer as shown in FIG. 3. Using 1 g of G9-PEGDM in 40 ml of water a highly viscous gel is formed. The gel is degraded by adding HCl until the pH is lowered to about 2. At this pH value the solution turns into a low viscosity liquid through the rupture of the polyethylenglycol methacrylate ester links

EXAMPLE 4

In this example a copolymer gel is obtained by grafting an "A" pre-polymer with a "B" pre-polymer (poly(ethyleneglycol) bismethacrylate) and a "C" spacer (acrylamide), yielding a copolymer containing several degradable ester links. The copolymer forms a high viscosity gel in an aqueous solvent.

Figure 4:
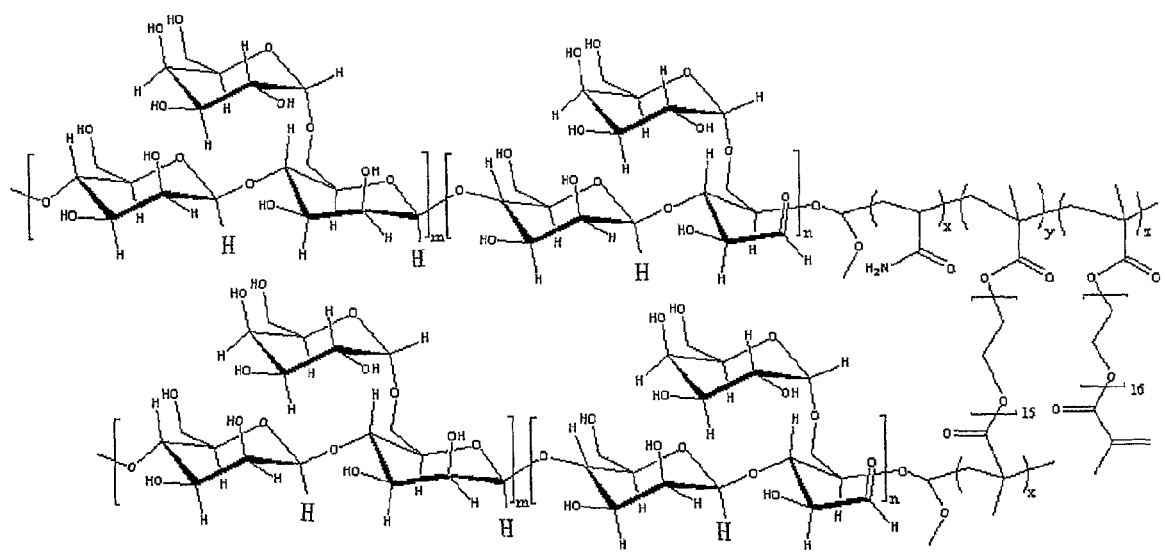

To prepare the grafted polymer (Code G9-PEGDM-AM), depolymerised natural Guar LamGUM LV (100 g of a 10% aqueous solution), poly(ethylene glycol) dimethacrylate (1 g, 10 wt % with respect to depolymerised guar), acrylamide (4 g 40 wt % with respect to depolymerised guar) and acetic acid (10 mL) are dissolved in water (500 mL) and degassed for 1 h at 50° C. Ammonium cerium (IV) nitrate (1 g) is added and the solution is stirred at 50° C. for a further 3 h. The polymer is precipitated 3 times in acetone to remove any unreacted monomer or ungrafted poly(acrylamide) homopolymer or poly(acrylamide-copolyethyleneglycol) dimethacrylate copolymer. The result is a branched copolymer as shown in FIG. 4.

Using 1 g of G9-PEGDM-AM in 40 ml of water a highly viscous gel is formed. The gel is degraded by adding HCl until the pH is lowered to about 2. At this pH value the solution turns into a low viscosity liquid through the rupture of the polyethylenglycol methacrylate ester links.

In the following examples the "A" pre-polymer comprises amino groups. Amino groups present in the structure of the "A" pre-polymer can react to produce carboxylic amides or sulfonic amide linkages with "B" or "C" pre-polymers containing any of the following reacting groups: i) carboxylic acid, ii) anhydride, iii) acyl halide, iv) ketene, v) ester, vi) amide, vii) sulfonic acid, viii) sulfonyl halide, ix) imide.

Examples of polymers containing amino groups that can be used as "A" pre-polymers are:
i) Polysaccharides containing chemically reactable primary amine groups such as: chitosan, depolymerized chitosan, modified chitosan, amino guar, amino starch, and the like.
ii) Polysaccharides listed previously grafted with polymers containing reactable primary amine groups or amine group precursors such as, poly(ammonium-alkyl-(meth)acrylate chloride) copolymers and the like.
iii) Synthetic water-soluble polymers that contain reactable primary amine groups, such as aminated polyacrylamide.
iv) Synthetic organic solvent soluble polymers that contain reactable primary amine groups, such as diamino-terminated poly(amines), poly(amides), poly(imides), poly(carbonates), epoxy resins, poly(acetals).
v) Water-soluble proteins and polypeptides containing the amino-acids lysine or/and arginine, or polypeptides modified to contain reactable primary amine groups such as, poly(ammonium-alkyl-(meth)acrylate chloride) copolymers and the like.

Examples of monomers or polymers containing groups that can be used as "B" pre-polymers to react with the amino-containing "A" groups listed above to yield degradable amide links are: aliphatic or aromatic polybasic acid, polyester, polyamide, dibasic acid anhydride, polybasic acid halide, polybasic acid alkyl ester, dibasic acid imide, dibasic acid bisimide, polybasic acid alkyl amide, poly(maleic anhydride) and copolymers, partially hydrolyzed poly(maleic anhydride) and copolymers, poly(styrenesulphonic acid).

Amino groups present in the structure of the "A" pre-polymer can also react to produce imine linkages with "B" or "C" pre-polymers containing any of the following reacting groups: i) aldehydes, ii) ketones, iii) hemiacetals, iv) acetals, v) triple bonds.

Examples of polymers containing amino groups that can be used as "A" pre-polymers with imine links are:
i) Polysaccharides containing primary amine groups such as: chitosan, depolymerized chitosan, modified chitosan, amino guar, amino starch, etc.
ii) Polysaccharides listed previously grafted with polymers containing reactable primary amine groups or amine group precursors such as, poly(ammonium-alkyl-(meth)acrylate chloride) copolymers and the like.
iii) Synthetic water soluble polymers that contain a reactable primary amine group, such as aminated poly(acrylamide), poly(amines), e.g. jeffamines.
iv) Synthetic organic solvent soluble polymers that contain reactable primary amine groups, such as diamino terminated poly(amines), poly(amides), poly(imides), poly(carbonates), epoxy resins, poly(acetals), poly(amines), e.g. jeffamines.
v) Water-soluble proteins and polypeptides containing the amino-acids lysine or/and arginine or polypeptides modified to contain reactable primary amine groups or amine group precursors such as, poly(ammonium-alkyl-(meth) acrylate chloride) copolymers and the like.

Examples of monomers or polymers containing groups that can be used as "B" pre-polymers to react with the "A" groups listed above to yield degradable imine links are: dialdehydes as glyoxal, malonyl dialdehyde, glutaric dialdehyde, galactose dialdehyde, bis(alkyl)hemiacetals of dialdehydes, bis(dialkyl)acetals of dialdehydes, poly(meth)acrolein homopolymer and copolymers, poly((meth)acrolein dialkyl acetal) homopolymer and copolymers, or any ditriple bond terminated structure.

As with the hydroxyl-terminated "A" pre-polymers above, the amino-terminated pre-polymer of these examples may be linked with the respective "B" pre-polymers via a non-degradable link, in which case the degradable link is contained in the "B" pre-polymer. These degradable "B" pre-polymers can be terminated by any of the following reacting groups: i) epoxy, ii) isocyanate, iii) primary alkyl halide iv) aromatic halides, or v) double bond.

Polymers containing amino groups that can be used as "A" pre-polymers are:

i) Polysaccharides containing primary amine groups such as: chitosan, depolymerized chitosan, modified chitosan, amino guar, amino starch, etc.
ii) Polysaccharides listed previously grafted with polymers containing reactable primary amine groups or amine group precursors such as, poly(ammonium-alkyl-(meth)acrylate chloride) copolymers and the like.
iii) Synthetic water soluble polymers that contain reactable primary amine groups, such as aminated poly(acrylamide), poly(amines), e.g. jeffamines.
iv) synthetic organic solvent soluble polymers that contain reactable primary amine groups, such as diamino terminated poly(amines), poly(amides), poly(imides), poly(carbonates), epoxy resins, poly(acetals); poly(amines), e.g. jeffamines.
v) Water-soluble proteins and polypeptides containing the amino-acids lysine or/and arginine or polypeptides modified to contain reactable primary amine groups or amine group precursors such as, poly(ammonium-alkyl-(meth) acrylate chloride) copolymers and the like.

Examples of monomers or polymers containing groups that can be used as "B" pre-polymers to react with the "A" groups listed above to yield degradable amide links are: aliphatic or aromatic, polyesters, polyamides, or structures containing perester, percarbonate, peroxide, persulphate, or azo links, that are terminated by dialdehydes, bis(dialkyl)acetals of a dialdehyde, bis(dialkyl)hemiacetals of a dialdehyde, diepoxys, diisocyanates, diprimary alkyl halides, diaromatic halides, didouble bonds.

EXAMPLE 5

Figure 5A:
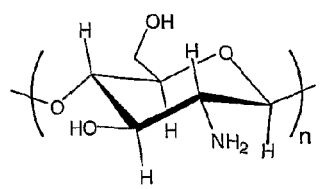
FIGS. 5A-D illustrate a base compound, its reaction, the gel strength and its degradation, respectively, of an example of the present invention.

The example describes a polymer gel obtained by reacting a medium molecular weight chitosan (code A2, Aldrich ref 44887-7 as shown in FIG. 5A) dissolved in 1% acetic acid and 3% potassium chloride aqueous diluent (100 g) as the A pre-polymer.

This Polymer A2 has the following properties:

| | |
|---|---|
| Intrinsic viscosity [η]: | 9.0 dL/g |
| Overlap concentration C*: | 0.41 wt % |
| Reduced overlap concentration [η] * C*: | 3.7 |
| Zero shear viscosity of a 0.5% solution: | 16.4 mPa s |
| Zero shear viscosity of a 1.0% solution: | 180 mPa s |

This polymer is reacted with 0.01 g-0.08 g of glutaraldehyde as "B" pre-polymer. The solution is stirred at 20° C. for 12 h yielding a high viscosity polymer gel in an aqueous solvent, which contains several degradable imine links.

Figure 5B:
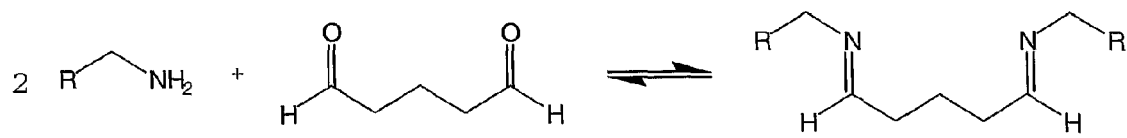

Chitosan is an amine functionalized polysaccharide which can react with dialdehydes, such as glutaraldehyde, to form covalent imine bonds via a Schiff reaction as shown in FIG. 5B where R is the chitosan backbone. This imine bond can be broken back to its aldehyde and amine by acid or base catalysis.

Figure 5C:
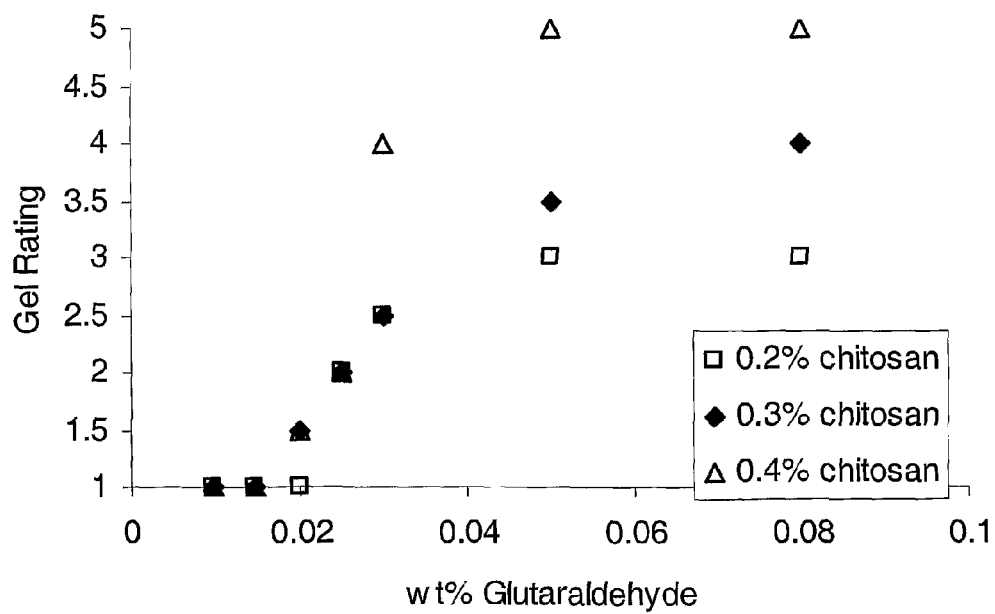

FIG. 5C shows the gel strength for a combination of different chitosan concentrations and glutaraldehyde concentrations. Since a fluid needs a gel strength rating greater than 3 to produce effective fractures with good proppant transport, it can be seen that for a 0.2% and 0.3% chitosan solution, a 0.05 wt % or higher glutaraldehyde concentration is sufficient to yield an appropriate fluid. For a 0.4% chitosan solution only 0.03 wt % glutaraldehyde is required.

Figure 5D:
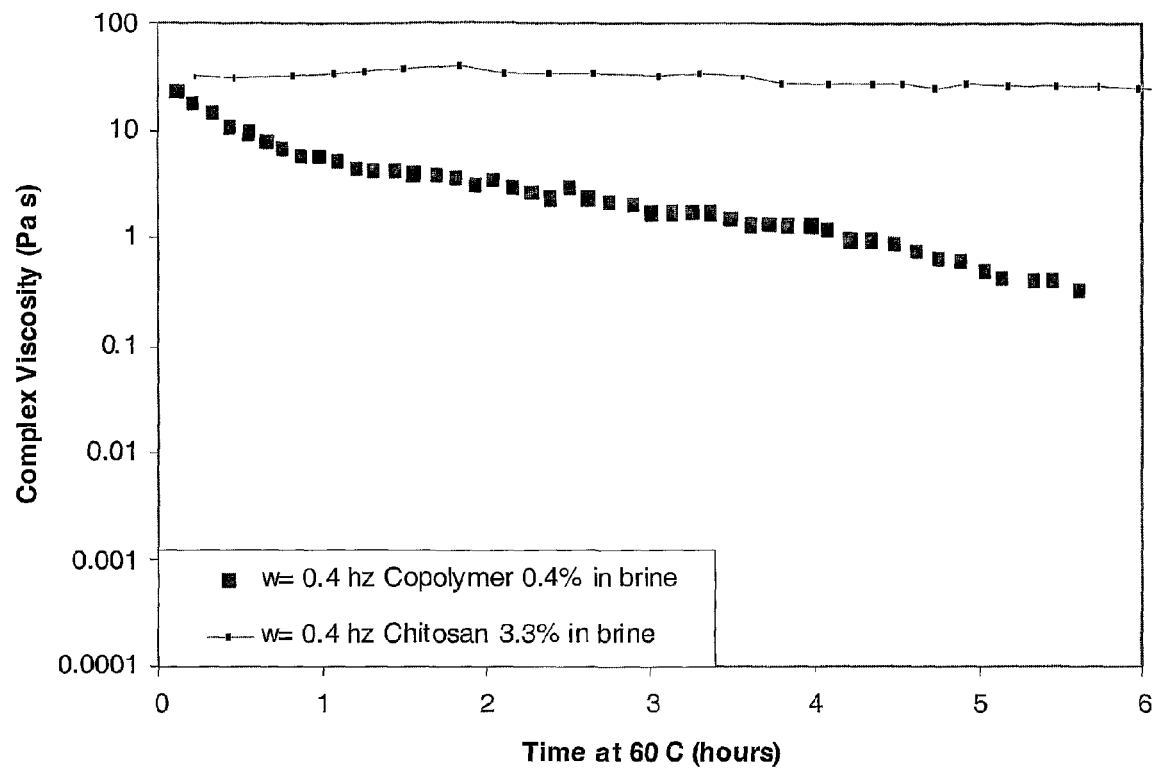

FIG. 5D shows the viscosity degradation profile (measured as the complex viscosity by dynamic Couette rheology) of a 0.4% Chitosan 0.03% glutaraldehyde polymer gel as a function of time at 60° C., compared to that of a pure Chitosan 3.3% showing the same viscosity at 0.063 rad/s. Note an initial fast decrease of the viscosity of approximately one decade in the first hour, followed by a slower decrease of approximately another decade in the following 5 hours on the polymer, while only a negligible decrease of viscosity for the chitosan homopolymer can be observed.

EXAMPLE 6

This example describes a polymer gel obtained by reacting as "A" pre-polymer 0.15 g of the medium molecular weight chitosan A2 used in the previous example in 10 g of aqueous solvent with 11.0 g of bis[3,4-epoxycyclohexylmethyl]adipate. The solution is stirred at 20° C. for 12 h resulting in a strong polymer gel in an aqueous solvent.

Figure 6:
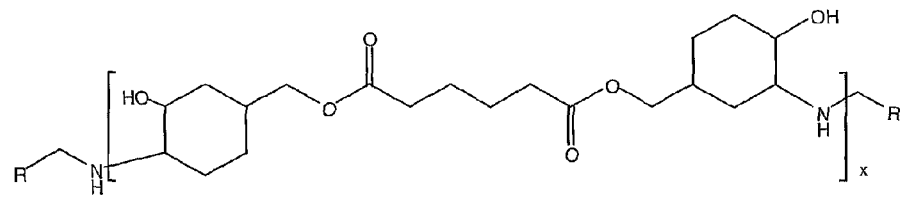
FIG. 6 illustrates the chemical structure of a compound for use in another example of the present invention.

Chitosan is an amine functionalized polysaccharide which can react with diepoxides, in particular Bis(3,4 epoxycyclohexylmethyl)adipate, to form covalent alpha hydroxyl amines as shown in FIG. 6. As evidenced by bottle test the two ester groups present in the adipate structure can be broken by acid or base catalysis, using, for example, HCl and water to lower the pH to 2.

The following examples make use of epoxy groups present in the structure of the "A" pre-polymer. The epoxy group can react to produce degradable alpha hydroxyl carboxylic ester; sulphonic ester; or amide links by reacting with "B" or "C" pre-polymers containing carboxylic acid and anhydride; sulphonic acid; or primary amide, imide, and imidazole reactive groups respectively.

Examples of polymers containing epoxy groups that can be used as "A" pre-polymers are:

i) Polysaccharides that can be modified to contain an epoxy group by means of a chemical reaction with either diepoxides, epicholorohydrin or other epoxy containing alkyl halides such as: naturally occurring galactomannans such as guar gum, carob or locust bean gum, tara gum; modified galactomannans such as hydroxypropyl guar, carboxymethyl guar, cationic guar, carboxymethyl hydroxypropyl guar, and their hydrophobically modified counterparts; depolymerized galactomannans, depolymerized modified galactomannans, starch, depolymerized starch, xanthan gum, depolymerized xanthan gum, chitin, chitosan, depolymerized chitin, depolymerized chitosan; naturally occurring alginates, depolymerized alginates, diutan, depolymerized diutan; modified cellulosic derivatives such as carboxymethyl cellulose, hydroxyethyl cellulose, hydroxypropyl cellulose, depolymerized modified cellulosic derivatives, kappa-carrageenan, iota-carrageenan, lambda carrageenan, depolymerized carrageenan, arabinoxylan, depolymerized arabinoxylan, beta-glucan, depolymerized beta-glucan, etc.
ii) Natural and modified polysaccharides listed above grafted with polymers containing pendant epoxy groups such as glycidyl (meth)acrylate copolymers and the like.
iii) Synthetic water soluble or dispersible polymers that contain reactable epoxy groups, such as water soluble or dispersed epoxy resins.
iv) Synthetic polymers that contain reactable primary epoxy groups, such as epoxy resins, glycidyl (meth)acrylate polymers and copolymers.
v) Water soluble proteins and polypeptides modified to contain an epoxy group by means of a chemical reaction with either diepoxides, epicholorohydrin or other epoxy containing alkyl halides; or grafted with polymers containing pendant epoxy groups such as, glycidyl (meth)acrylate copolymers and the like.

Examples of monomers or polymers containing groups that can be used as "B" pre-polymers to react with the "A" groups listed above to yield degradable carboxylic ester or sulphonic ester links are: Aliphatic or aromatic polybasic acid; dicarboxylic acid terminated, aliphatic or aromatic poly (esters) or poly(amides); poly(acrylic acid); poly(acrylic acid) copolymers; poly(methacrylic acid) and copolymers, poly(maleic anhydride) and copolymers, partially hydrolyzed poly(maleic anhydride) and copolymers, poly(styrene sulphonic acid) and copolymers.

Examples of monomers or polymers containing groups that can be used as "B" pre-polymers to react with the "A" groups listed above to yield degradable amide links are: aliphatic polybasic acid diamides, such as adipamide and the like; aromatic polybasic acid diamide such as phthalic diamide, terephthalamide, isophthalamide and the like; diamide terminated aliphatic or aromatic polyester or polyamide; poly (acrylamide) and copolymers; poly(methacrylamide) and copolymers; aliphatic polybasic acid imides, such as succinimide, maleimide and the like; aromatic polybasic acid imides such as phthalimide, napthalimide and the like, polymeric imides such as polysuccinimide, dialkyl imidazoles, polyamino alkyl imidazoles, dicyandiamide, and the like.

As described with the other examples, there are variants of epoxy reactions which result in non-degradable bonds. In these cases the degradable link is found within the structure of the "B" pre-polymer. For example, epoxy groups present in the structure of the "A" pre-polymer can react to produce non degradable bonds with "B" or "C" pre-polymers containing degradable links which are terminated in any of the following reacting groups: i) primary or secondary amines, or pre-polymered amines such as ketimines ii) primary or secondary hydroxyl groups, iii) mercaptans.

Examples of polymers containing epoxy groups that can be used as "A" pre-polymers for non-degradable linkage are:

i) Polysaccharides that can be modified to contain an epoxy group by means of a chemical reaction with either diepoxides, epicholorohydrin or other epoxy containing alkyl halides such as: naturally occurring galactomannans such as guar gum, carob or locust bean gum, tara gum; modified galactomannans such as hydroxypropyl guar, carboxymethyl guar, cationic guar, carboxymethyl hydroxypropyl guar, and their hydrophobically modified counterparts; depolymerized galactomannans, depolymerized modified galactomannans, starch, depolymerized starch, xanthan gum, depolymerized xanthan gum, chitin, chitosan, depolymerized chitin, depolymerized chitosan; naturally occurring alginates, depolymerized alginates, diutan, depolymerized diutan; modified cellulosic derivatives such as carboxymethyl cellulose, hydroxyethyl cellulose, hydroxypropyl cellulose, depolymerized modified cellulosic derivatives, kappa-carrageenan, iota-carrageenan, lambda carrageenan, depolymerized carrageenan, arabinoxylan, depolymerized arabinoxylan, beta-glucan, depolymerized beta-glucan, etc.

ii) Natural and modified polysaccharides listed above grafted with polymers containing pendant epoxy groups such as, glycidyl (meth)acrylate copolymers and the like.

iii) Synthetic water dispersible polymers reactable epoxy groups, such as dispersed epoxy resins.

iv) Synthetic polymers that contain reactable primary epoxy, such as epoxy resins, glycidyl (meth)acrylate polymers and copolymers.

v) Water soluble proteins and polypeptides modified to contain an epoxy group by means of a chemical reaction with either diepoxides, epicholorohydrin or other epoxy containing alkyl halides; or grafted with polymers containing pendant epoxy groups such as, glycidyl (meth)acrylate copolymers and the like.

Examples of polymers terminated or containing any of the groups listed above that can be used to link degradable "B" pre-polymers to the "A" pre-polymers listed above by means of their reaction with the epoxy groups of the "A" pre-polymers, are: diamino-terminated, dihydroxy-terminated, dimercapto-terminated i) aliphatic or aromatic, poly(esters) derived from polyhydric alcohol and polybasic acid, or ii) poly(amides) derived from a poly(amine) e.g. polyoxyalkylene polyamines (jeffamines), and polybasic acid, where the polybasic acid may contain at least two secondary amine groups, or iii) diamino terminated structures containing perester, percarbonate, peroxide, persulphate, or azo links.

EXAMPLE 7

Several polymer gels obtained by copolymerizing one such "A" pre-polymer (depolymerized guar) grafted with one such "B" polyester pre-polymer (poly(glycidyl methacrylate)) by means of different "C" amino containing bridge groups are described, yielding high viscosity polymer gels in water or brine solvent, which contains several degradable ester links.

Figure 7A:
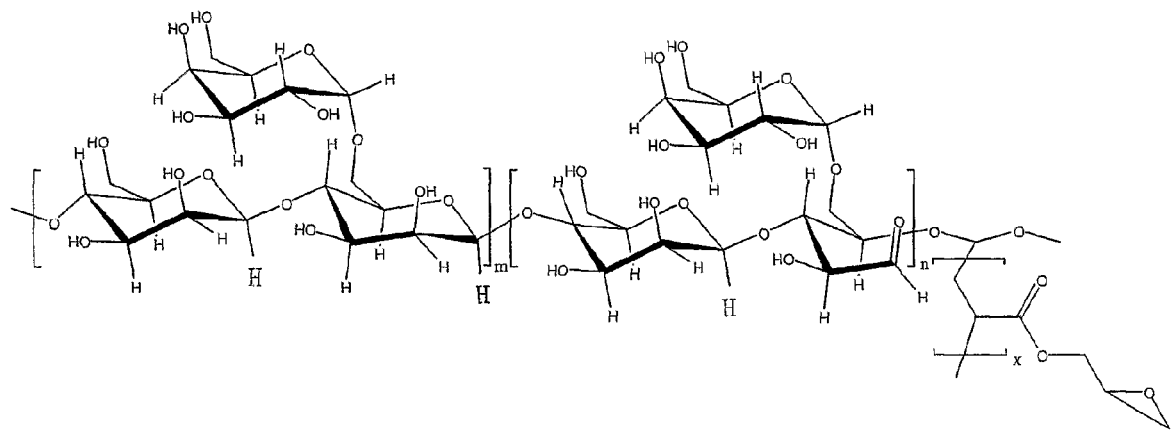
FIGS. 7A-C illustrate a base compound, its reaction, and the gel strength degradation, respectively, of another example of the present invention.

To prepare the glycidyl methacrylate-grafted depolymerised natural Guar LamGUM LV (Code G9-GMA), a solution of depolymerised natural Guar LamGUM LV (100 g of a 10% aqueous solution) as above is taken. Glycidyl methacrylate (1 g, 10 wt % with respect to depolymerised guar) is added and are dissolved/dispersed in water (390 mL) together with acetic acid (10 mL) and degassed for 1 h at 50° C. Ammonium cerium (IV) nitrate (1 g) is added and the reaction mixture is stirred at 50° C. for a further 3 h. The polymer as shown in FIG. 7A is precipitated 3 times in acetone to remove any unreacted monomer or poly(glycidyl methacrylate) homopolymer.

The polymer gel is prepared by adding 2 g of a 5% aqueous solution of the above G9-GMA with various multiple amine containing materials, whilst the solution is vigorously stirred. This method of coupling "A" to "B" pre-polymers relies on the well-known reaction of the epoxy group with the amine.

The following table 1 summarizes the various amines and their respective quantities used and the gel strengths achieved.

TABLE 1

| "C" Multiple amine containing material bridge | | Quantity (g) | Gel Code 1-5 |
|---|---|---|---|
| Type | | | |
| — | | — | 1 |
| Tris(aminoethyl)amine | [structure: H₂N-CH₂CH₂-N(CH₂CH₂NH₂)₂] | 0.20 | 5 |
| Polymer 5 - chitosan A2 | | 0.51 | 1 |
| Hexamethylenediamine | [structure: H₂N-(CH₂)₆-NH₂] | 0.21 | 5 |
| Epikure 197* | [structure: substituted phenol with CH₂-N(H)-R'-NH₂] | 0.23 | 5 |
| Epikure 3055* | [imidazoline structure with polyamine chain ending in NH₂] | 0.25 | 5 |
| Epikure 8535w50* (Epikure 3055* dispersed in water) | + [amide-linked polyamine structure] | 0.05 | 5 |

Figure 7B:
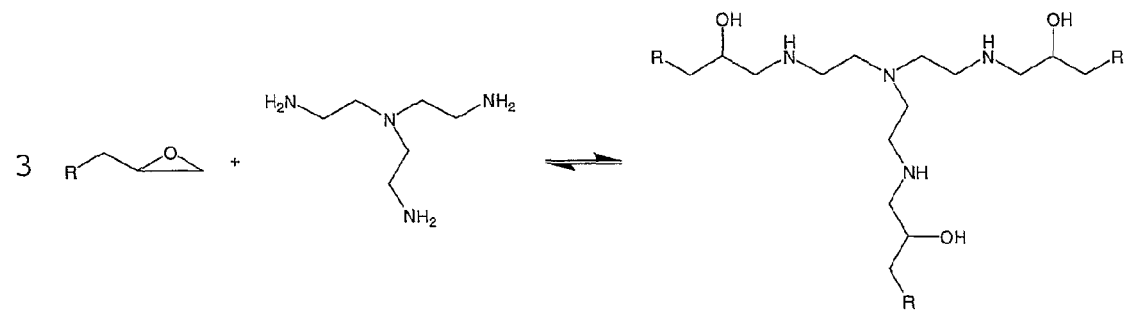

*Epikure polymers can be sourced from Resolution Performance Products.
Gel strength codes used are
1 fluid viscosity same as original polymer solution
2 fluid viscosity slightly higher than original solution
3 significantly cross-linked to give a flowing gel
4 "tonguing" or "lipping" gel
5 barely flowing gel on inversion
6 gel deforms but does not flow on inversion The reaction of the first amine tris(aminoethyl)amine with the polymer G9-GMA (denoted by R) is illustrated in FIG. 7B. To get a fluid with gel strength of 3 or above, 0.02 g of tris(2-aminoethyl)amine is required for polymer G9-GMA at the given concentration.

The polymer of G9-GMA and tris(aminoethyl)amine can be readily degraded using HCl.

Figure 7C:
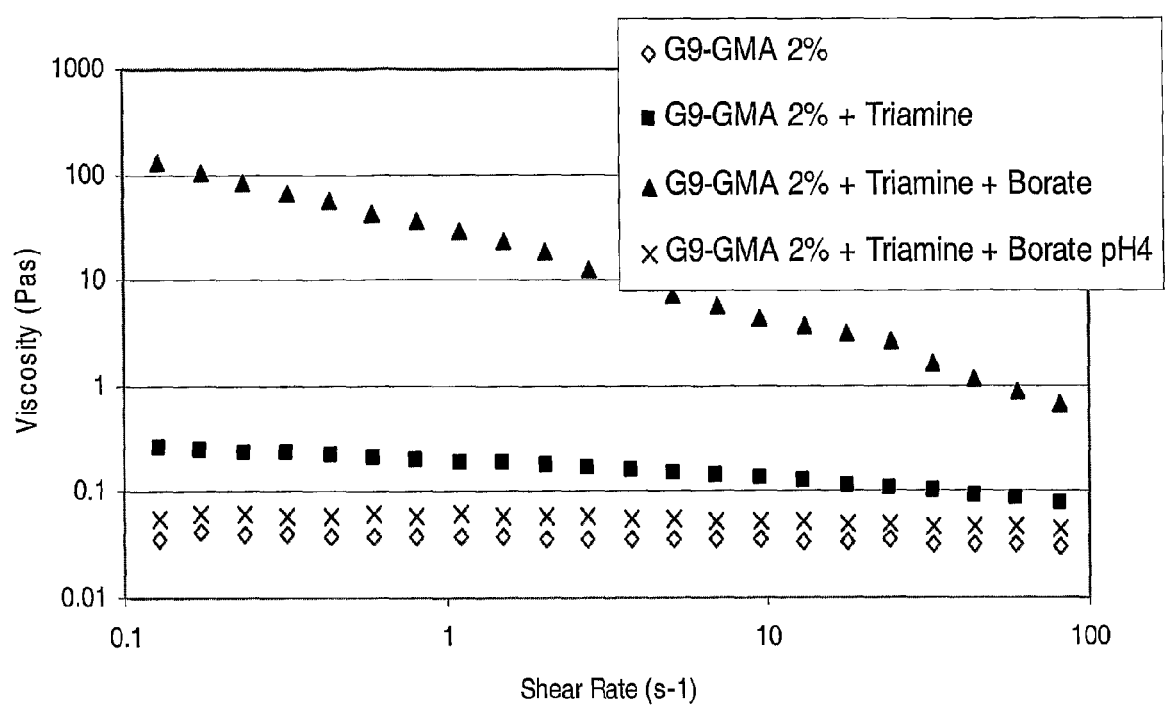

The graph of FIG. 7C illustrates for the same copolymer the increase in viscosity from a pure G9-GMA polymer (diamonds) to a degradable polymer (squares) and a cross-linked variant of the degradable polymer (using borate as cross-linker, denoted by triangles in the figure). The viscosity returns to almost the initial value in a medium with pH=4 (crosses).

The following examples refer to the use of aldehyde groups, or their derivatives, such as alkyl hemiacetals or dialkyl acetals, present in the structure of the "A" pre-polymer. These groups can react to produce degradable acetal or imine links by reacting with "B" or "C" pre-polymers containing hydroxy or amino groups respectively.

Examples of polymers containing aldehyde groups (or their alkyl alcohol derivatives, alkyl hemiacetals or dialkyl acetals) that can be used as "A" pre-polymers are:
i) Polysaccharides containing chemically at least two end aldehyde groups (or their derivatives: alkyl hemiacetals or dialkyl acetals) such as: naturally occurring branched galactomannans such as branched guar gum, carob, locust bean gum or tara gum; modified branched galactomannans such as branched hydroxypropyl guar, carboxymethyl guar, cationic guar, carboxymethyl hydroxypropyl guar and their branched and/or hydrophobically modified counterparts; branched depolymerized galactomannans, branched depolymerized modified galactomannans, branched starch, branched depolymerized starch, branched xanthan gum, branched depolymerized xanthan gum, branched chitin, branched chitosan, branched depolymerized chitin, branched depolymerized chitosan; naturally occurring branched alginates, branched depolymerized alginates, branched diutan, branched depolymerized diutan; modified branched cellulosic derivatives such as branched carboxymethyl cellulose, branched hydroxyethyl cellulose, branched hydroxypropyl cellulose, branched depolymerized modified cellulosic derivatives, branched kappa-carrageenan, branched iota-carrageenan, branched lambda carrageenan, branched depolymerized carrageenan, branched arabinoxylan, branched depolymerized arabinoxylan, branched beta-glucan, branched depolymerized beta-glucan etc. and/or hydrophobically modified counterparts.

ii) Polysaccharides mentioned above modified to produce dialdehyde groups (or their alkyl alcohol derivatives, alkyl hemiacetals or dialkyl acetals) by means of an oxidation reaction on the bond between carbons 2 and 3, such as guar or dextran polyaldehyde, and examples of the polysaccharides mentioned above modified to produce terminal aldehyde groups by means of an oxidation reaction on carbon 6, such as guar polyaldehyde.

iii) Polysaccharides mentioned above grafted with polymers containing aldehyde groups such as poly((meth)acrolein) homopolymer or copolymers, (or aldehyde groups precursors such as their derivatives: alkyl hemiacetals or dialkyl acetals)

iv) Synthetic water soluble polymers containing aldehyde groups such as poly((meth)acrolein) homopolymer or copolymers, (or aldehyde groups precursors such as their derivatives: alkyl hemiacetals or dialkyl acetals)

Examples of monomers or polymers containing groups that can be used as "B" pre-polymers to react with the "A" groups listed above to yield acetal links are:

Aliphatic diols and polyols, dihydroxy terminated aliphatic or aromatic polyesters or polyamides; poly(vinyl alcohol); poly(vinyl alcohol) copolymers; etc Examples of monomers or polymers containing groups that can be used as "B" pre-polymers to react with the "A" groups listed above to yield degradable imine links are: aliphatic diamines and poly(amines), amino containing polysaccharides such as chitosan and its derivatives, diamino terminated aliphatic or aromatic poly(esters) or poly(amides), poly(oxyalkylene polyamines) (jeffamines).

EXAMPLE 8

In this example several polymer gels are obtained by copolymerizing an "A" pre-polymer (depolymerized guar) grafted with a "C" aldehyde containing bridge groups (polyacrolein) with different amino containing "B" pre-polymers, yielding high viscosity polymer gels in water or brine solvent, which contains several degradable imine links.

Figure 8A:
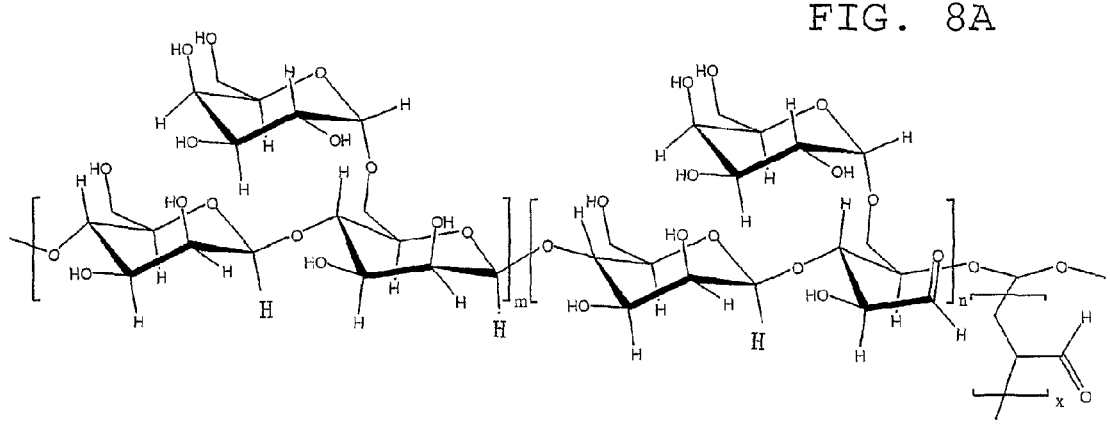
FIGS. 8A-B illustrate the base compound and the gel strength degradation, respectively, of another example of the present invention.

To prepare a grafted polymer, the depolymerised natural Guar LamGUM LV™ (100 g of a 10% aqueous solution), acrolein (1 g, 10 wt % with respect to depolymerised guar) and acetic acid (10 mL) are dissolved in water (390 mL) and degassed for 1 h at 50° C. Ammonium cerium (IV) nitrate (1 g) is added and the solution was allowed to stir at 50° C. for a further 3 h. The polymer (code G9-CHO) as shown in FIG. 8A is precipitated 3 times in acetone to remove any unreacted monomer or ungrafted poly(acrolein) homopolymer.

Two different amines, tris(aminoethyl)amine and hexamethylenediamine (as shown in table 1) are used as "B" pre-polymers. The reaction uses an aqueous solution of the grafted polymer and the amines in quantities as listed in table 2. The table also indicates the gel strength of the resulting pre-polymer copolymers.

TABLE 2

| "A-C" Polymer G9-CHO | | "B" | |
|---|---|---|---|
| Conc (%) | Quantity (g) | Tris(2 aminoethyl)amine Quantity (g) | Gel Code 1-5 |
| 2 | 10 | — | 1 |
| 1 | 10 | 0.2607 | 1.5 |
| 1 | 10 | 0.013 | 1 |
| 2 | 10 | 0.2607 | 3.5 |
| 2 | 10 | 0.0261 | 3.5 |
| 2.5 | 10 | 0.6518 | 5 |
| 2.5 | 10 | 0.0326 | 3 |
| 3 | 10 | 0.7821 | 5 |
| 3 | 10 | 0.0391 | 4 |

| "A-C" Polymer G9-CHO | | "B" | |
|---|---|---|---|
| Conc (%) | Quantity (g) | Hexamethylenediamine Quantity (g) | Gel Code 1-5 |
| 1 | 10 | 0.2075 | 1.5 |
| 1 | 10 | 0.0104 | 1 |
| 2 | 10 | 0.4150 | 5 |
| 2 | 10 | 0.0208 | 1.5 |
| 2.5 | 10 | 0.5188 | 5 |
| 2.5 | 10 | 0.0259 | 2 |
| 3 | 10 | 0.6226 | 5 |
| 3 | 10 | 0.0311 | 2 |

For gel strength code definition, refer to footnote in Table 1.

Figure 8B:
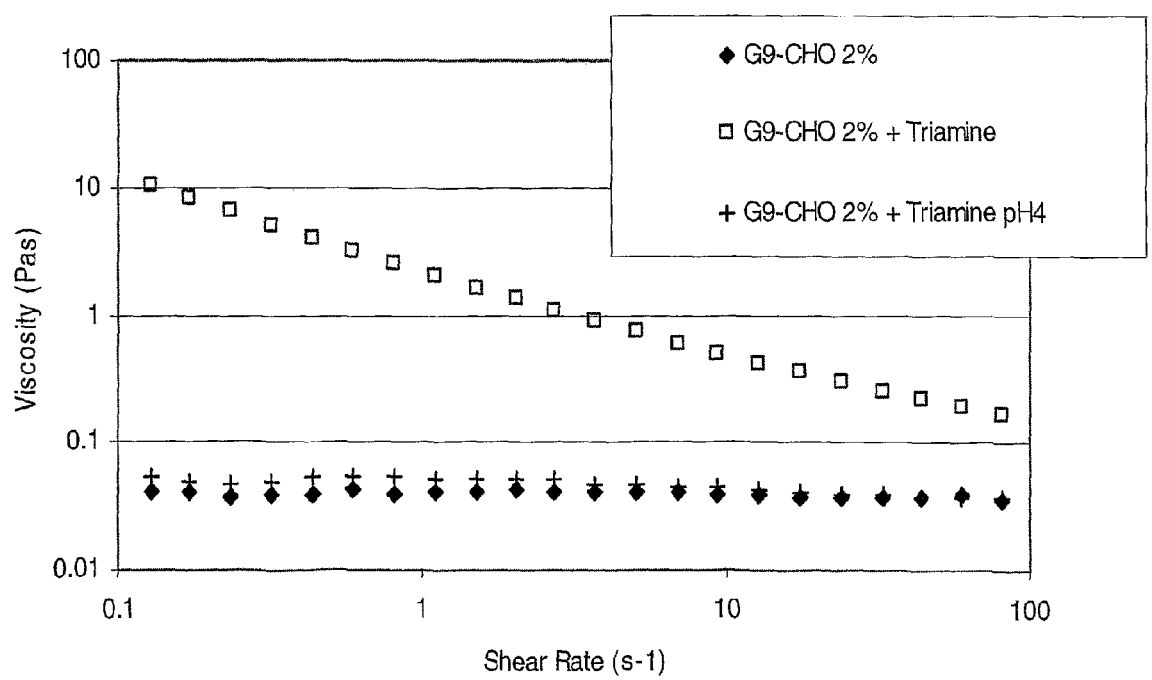

The rheogram in FIG. 8B illustrates the increase between the grafted polymer G9-CHO (diamonds) and the polymer with the triamine. This higher viscosity can be reduced to almost the exact original values by adjusting the solution to pH 4.

The following examples make use of "A" pre-polymers with either an ester or an amide as functional group. Ester, (carboxylic acid ester, sulphonic acid ester, phosphoric acid ester) groups and amide (carboxylic acid amide or sulphonic acid amide, phosphoric acid amide) present in the structure of the "A" pre-polymer can react to produce ester or amide links by reacting with "B" or "C" pre-polymers containing hydroxy or amino groups.

Examples of polymers containing ester or amide groups are i) Polysaccharides mentioned above modified to contain ester groups by esterification of their hydroxyl groups with carboxylic acid derivatives such as cellulose acetate, butyrate and the like, or with phosphoric acid esters or sulphonic acid esters, or their carboxylic acid groups as alginic acid esters or xanthan esters. Examples of the natural polysaccharides mentioned above containing amide groups such as chitin and its derivatives. Examples of the natural polysaccharides mentioned above modified to contain amide groups by amidation of their amino groups, such as chitosan alkylates, or their carboxylic acid groups as alginic acid amides or xanthan amides.

ii) Polysaccharides mentioned above grafted with polymers containing ester groups such as poly(alkyl(meth)acrylate) homopolymer or copolymers, poly(ethylenoxide(meth) acrylate) homopolymer or copolymers, poly(ethylenoxidebis(meth)acrylate) homopolymer or copolymers.

iii) Synthetic water soluble polymers containing ester groups such as partially hydrolyzed poly(vinyl acetate) homopolymer or copolymers, partially hydrolyzed poly (vinyl alkanoate) homopolymer or copolymers.

Examples of monomers or polymers containing groups that can be used as "B" pre-polymers to react with the "A"

groups listed above to yield ester links are: aliphatic diols and polyols; dihydroxy terminated aliphatic or aromatic polyesters or polyamides; poly(vinyl alcohol); poly(vinyl alcohol) copolymers etc.

Examples of monomers or polymers containing groups that can be used as "B" pre-polymers to react with the "A" groups listed above to yield degradable amide links are: aliphatic diamines and poly(amines), amino containing polysaccharides such as chitosan and its derivatives, diamino terminated aliphatic or aromatic poly(esters) or poly (amides), poly(oxyalkylene polyamines) (jeffamines), poly ((meth)acrylamide) homopolymer and copolymers.

EXAMPLE 9

This example 9 discloses several polymer gels obtained by copolymerizing one such "A" pre-polymer (depolymerized guar) grafted with one such "B" ester containing pre-polymer. (polyethyleneglycolbismethacrylate-co acrylamide) by means of its reaction with different amino containing "C" pre-polymers, yielding high viscosity polymer gels in water or brine solvent, which contains several degradable amide and ester links.

The (ethylene glycol) dimethacrylate-co-poly(acrylamide)-grafted depolymerized natural Guar LamGUM™ is prepared as described in Example 4 above. The resulting polymer (code G9-PEGDM-AM) is then dissolved in water and mixed with multiple amine-containing material in accordance with the quantities given in table 3. The solution is stirred for 24 h to obtain a copolymer with higher viscosity by transester-amidation.

TABLE 3

| "A" Polymer G9-PEGDM-AM | | "B" Multiple amine containing material | | Gel |
|---|---|---|---|---|
| Conc (%) | Quantity (g) | Type | Quantity (g) | Code 1-5 |
| 5 | 2 | Tris(2-aminoethyl)amine | 0.2 | 5 |
| 5 | 2 | Polymer 5 - medium mwt chitosan | 1 | 1 |
| 5 | 2 | Trisamino ethylamine polymer bound | 0.2 | 1 |
| 5 | 2 | Hexamethylendiamine | 0.23 | 5 |
| 5 | 2 | Epikure 197 | 0.2 | 5 |
| 5 | 2 | Epikure 8535w50 | 0.44 | 5 |
| 5 | 2 | Epikure 3055 | 0.18 | 5 |
| 5 | 2 | Epikure 3402 | 0.19 | 3 |
| 2.5 | 4 | Epikure 8535w50 | 0.3 | 3 |
| 2.5 | 1 | Epikure 8535w50 | 0.3 | 2 |
| 2.5 | 1 | Diamino-terminated Bisphenol A epoxy 348 | 0.1 | 5 |
| 5 | 2 | Diamino-terminated Bisphenol A epoxy 4000 | 0.1 | 5 |
| 5 | 2 | Diamino-terminated Bis(3,4-epoxycyclohexylmethyl)adipate | 0.1 | 5 |
| 1 | 2 | Diamino-terminated Bis(3,4-epoxycyclohexylmethyl)adipate | 0.1 | 2 |
| 1 | 2 | Diamino-terminated Bis(3,4-epoxycyclohexylmethyl)adipate | 0.1 | 1 |
| 0.5 | 2 | Diamino-terminated Bis(3,4-epoxycyclohexylmethyl)adipate | 0.1 | 1 |
| 0.5 | 2 | Diamino-terminated Bis(3,4-epoxycyclohexylmethyl)adipate | 0.1 | 1 |

For gel strength code definition, refer to footnote in Table 1.

Regarding the compounds used as "B" pre-polymers in table 3, the medium molecular weight chitosan is shown in FIG. 5A. The Epikure polymers are commercially available from Resolution Performance Products. Diamino-terminated Bisphenol A epoxy 348 is prepared by dissolving Bisphenol A epoxy resin (10 g, Mw 348, Aldrich ref. no. 40682-1) in THF (12 g). Hexamethylene diamine (20 g) is added and the solution is stirred for 24 h at 20° C. to obtain the diamino terminated bisphenol epoxy resin. Diamino-terminated Bisphenol A epoxy 4000 is prepared by dissolving Bisphenol A epoxy resin (10 g, Mw 4000, Aldrich ref. no 40546-9) in THF (36 g). Hexamethylene diamine (2 g) is added and the solution was stirred for 24 h at 20° C. to obtain a diamino terminated bisphenol epoxy resin. Diamino-terminated Bis (3,4-epoxycyclohexylmethyl)adipate is prepared by dissolving bis(3,4-epoxycyclohexylmethyl)adipate (10.4 g, Aldrich ref. No. 40606-6) in THF (13 g). Hexamethylene diamine (20 g) is added and the solution is stirred for 24 h at 20° C. to obtain a mixture of diamino terminated degradable adducts.

Two of the copolymers detailed in table 3, Polymer G9-PEGDM-AM+Epikure 197 and Polymer G9-PEGDM-AM+Epikure 8535w50 do not show a drop in viscosity when acidified to pH 5. However, a very significant decrease of viscosity to a gel code 1 with no insolubles precipitation can be observed when the pH is decreased further to pH 3 with hydrochloric acid.

Figure 9:
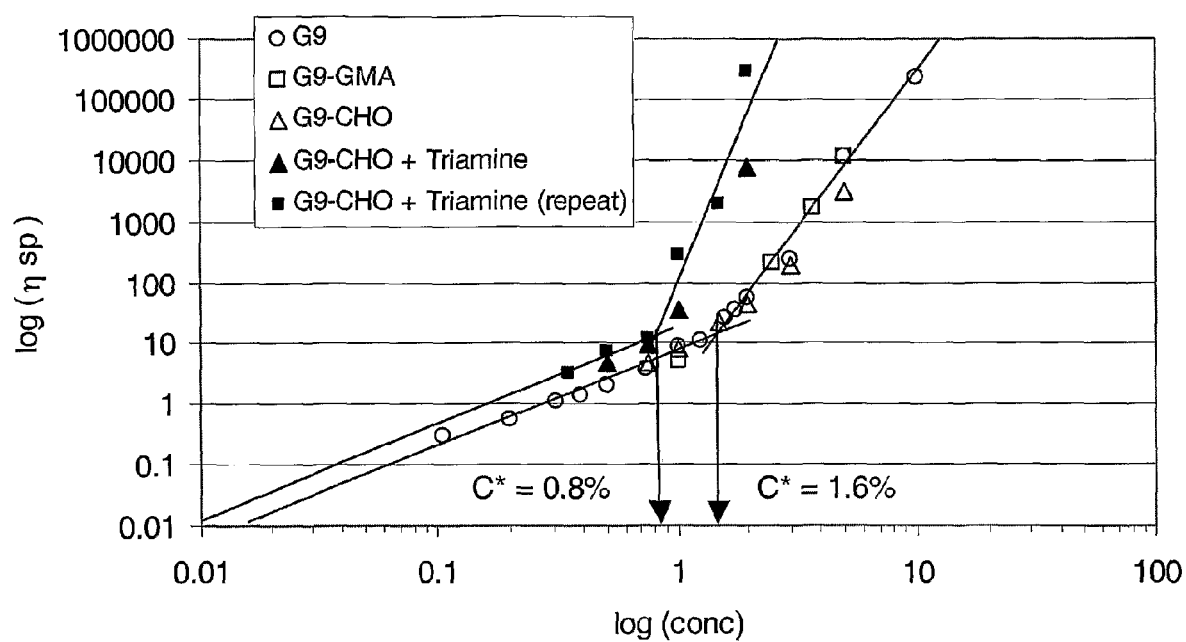
FIG. 9 illustrates the specific viscosity at various concentrations for unmodified polymers and modified polymers in accordance with an example of the present invention.

In FIG. 9, the advantages of the copolymers disclosed in the current application are illustrated when used as wellbore fluids as compared to the existing polymer fluids.

In the figure, the change of specific viscosity (calculated as the rate between the zero shear viscosity of a given polymer solution minus the solvent viscosity, divided by the solvent viscosity) is shown as a function of the polymer concentration in weight percent.

Five polymers and copolymers are depicted in the figure; open circles show the change of viscosity obtained for G9, de-polymerized guar at various polymer concentrations. An estimate of the overlap concentration from this plot, C*, would be close to 1.6%.

The open squares show the change of viscosity with polymer concentration for G9-GMA, glycidyl methacrylate grafted de-polymerized guar, and the open triangles show the change of viscosity with polymer concentration for G9-CHO, acrolein grafted de-polymerized guar. It can be seen from these traces, that both the grafted G9 polymers: G9-GMA and G9-CHO, have the same viscosity as a function of polymer concentration as the unmodified G9. However, after reaction with the triamine, the viscosity versus polymer concentration trace of Example 8 (G9-CHO+triamine), (the solid triangles and diamonds) clearly exhibits a higher viscosity at any given concentration. An estimate of the overlap concentration from these two traces would be close to 0.8 wt %.

In an operation, a linear gel wellbore fluid requiring a given value of specific viscosity (for instance 10000 cP) would be obtained with a substantially lower polymer concentration (1.8 wt %) using G9-CHO+triamine (Example 8) as compared to using any of the "A" pre-polymers G9, G9-GMA or G9-CHO, for either of which 5.2 wt % of the polymer is required to reach the specific viscosity of 10000 cP.

Using a mild trigger (mild acid or base), or even the formation fluid, the specific viscosity of the linear gel obtained with G9-CHO+triamine (Example 8) could be converted from 10000 cP to ~12 cP due to the degradation of the ester links. If the fluid was to be used as, for example, a fracturing fluid, a much better proppant pack clean-up would be achieved by flowing back a fluid with a specific viscosity of 12 cP as compared to one with a specific viscosity of 10000 cP. The latter would require the use of much more aggressive breakers, that would not be as selective as the cleavage of the degradable links present in Example 8, yielding fragments of polymer of various uncontrolled lengths and solubilities. Such fragments could result in damage to the formation and/ or the proppant pack. The degradation of Example 8 however, would yield controlled molecular weight fragments, which would be soluble as per the design of the "A" pre-polymer and therefore would not result in any damage to either the proppant pack or the formation.

The average increase of molecular weight between G9 and G9-CHO+triamine (Example 8), estimated from their C*, as discussed above, is in the order of 3 times. Hence there is further potential in using a higher molecular weight "A" pre-polymer, e.g. natural guar, to produce a copolymer that would be 3 times larger in molecular weight than natural guar, such a polymer when modified in accordance with the methods of the present invention could be used at roughly half the concentration as used currently in the field.

A similar advantage results from using the polymers of the present invention in combination with a cross-linker such as borate. Again it can be shown that the new polymers in a crosslinked state exhibit higher viscosities at equivalent concentrations of polymer and crosslinker than the crosslinked unmodified polymer.

The polymers of the present invention may also be based on the linkage of other functional groups such as carboxylic acid, sulphonic acid, carboxylate, anhydride, isocyanate, pre-polymered isocyanate, halide, being present in the "A" pre-polymer, and used to link these to the "B" or "C" pre-polymers containing hydroxyl, epoxy, amino, halide reacting groups, through degradable bonds, such as ester, amide, perester, percarbonate, peroxide, persulphate, or azo links, or non degradable bonds of various natures such as urea, urethane, ether.

Another alternative structure of the polymers of the invention could be where two types of degradable bonds of different structure and reactivity are present in the "B" pre-polymers. Examples would include any of the "B" pre-polymers listed above, that can be used to react with the "A" groups to yield degradable imine links, which also contain multiple degradable bonds such as: dialdehyde terminated-, bis(di-alkyl)acetals of dialdehyde terminated-, bis(alkyl)hemiac-etals of dialdehyde terminated-, aliphatic or aromatic poly (esters), poly(amides), or structures containing perester, percarbonate, peroxide, persulphate, or azo links.

Other examples of structures that may be used as "A" and "B" pre-polymers, in accordance with embodiments of the present invention are those listed below:

EXAMPLE 10

This example, reaction depicted below, illustrates a degradable viscosifier, in accordance with an embodiment of the present invention, that may be obtained by reaction of a partially hydrolysed polyvinylacetate copolymer "A" polymer, such as the material that can be purchased under code 363103 from Sigma-Aldrich UK CAS 9002-89-5 with an average molecular weight of 146-186 KDa and a degree of hydrolysis of 87-89% in a suitable non aqueous solvent or the like, with a suitable amount of "B" building block, such as Adipoyl chloride, CAS 111-50-2 (Sigma-Aldrich UK code 165212) or the like, yielding a copolymer containing several degradable ester links. In accordance with an embodiment of the present invention, the copolymer may be used to form a high viscosity gel in some organic solvents and in some aqueous solvents.

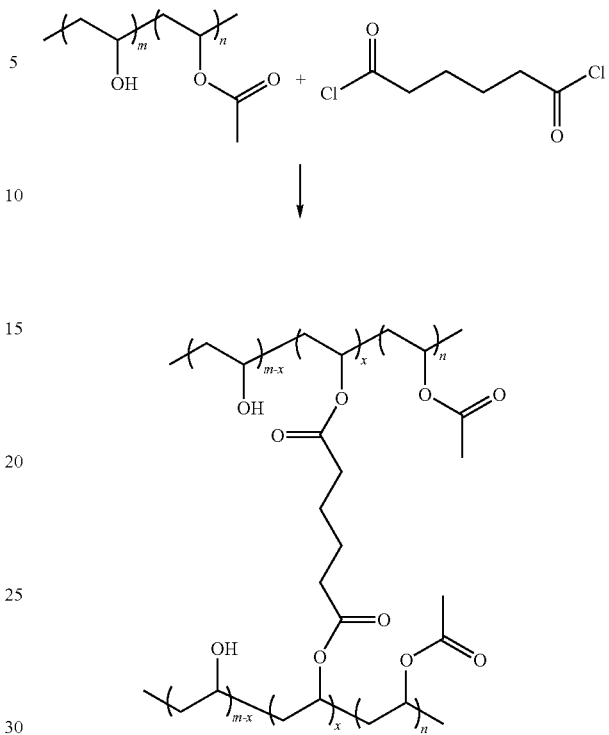

EXAMPLE 11

This example, reaction depicted below, illustrates a degradable viscosifier, in accordance with an embodiment of the present invention, that may be obtained by acid catalyzed esterification of a partially hydrolysed polyvinylacetate copolymer, the "A" polymer, such as the material that can be purchased under code 363103 from Sigma-Aldrich UK CAS 9002-89-5 with an average molecular weight of 146-186 KDa and a degree of hydrolysis of 87-89% or the like, in a suitable non aqueous solvent with a suitable amount of "B" building block, such as polyacrylic acid, CAS 9003-01-4 (Sigma-Aldrich UK code 323667) with a molecular weight of 1800 Da or the like yielding a copolymer containing several degradable ester links. In accordance with an embodiment of the present invention, the copolymer may be used to form a high viscosity gel in some organic solvents and in some aqueous solvents.

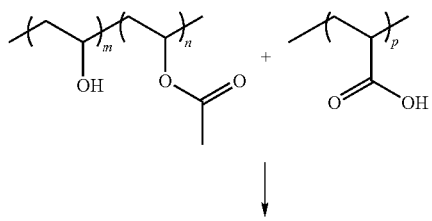

EXAMPLE 12

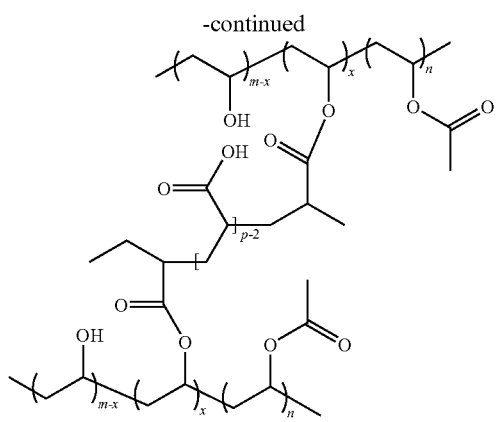

This example, reaction depicted below, illustrates a degradable viscosifier, in accordance with an embodiment of the present invention, that may be obtained by acid catalyzed esterification of a partially hydrolysed polyvinylacetate copolymer, "A" polymer, such as the material that can be purchased under code 363103 from Sigma-Aldrich UK (CAS 9002-89-5) with an average molecular weight of 146-186 KDa and a degree of hydrolysis of 87-89% or the like, in a suitable non aqueous solvent with a suitable amount of "B" building block, such as Poly(ethyleneadipate)tolylene 2-4 diisocynate, CAS 9019-92-5, Sigma-Aldrich UK code 433500 with a molecular weight of 2700 Da or the like, to yield a copolymer containing several degradable ester links. In accordance with an embodiment of the present invention, the copolymer may be used to form a high viscosity gel in some organic solvents and in some aqueous solvents.

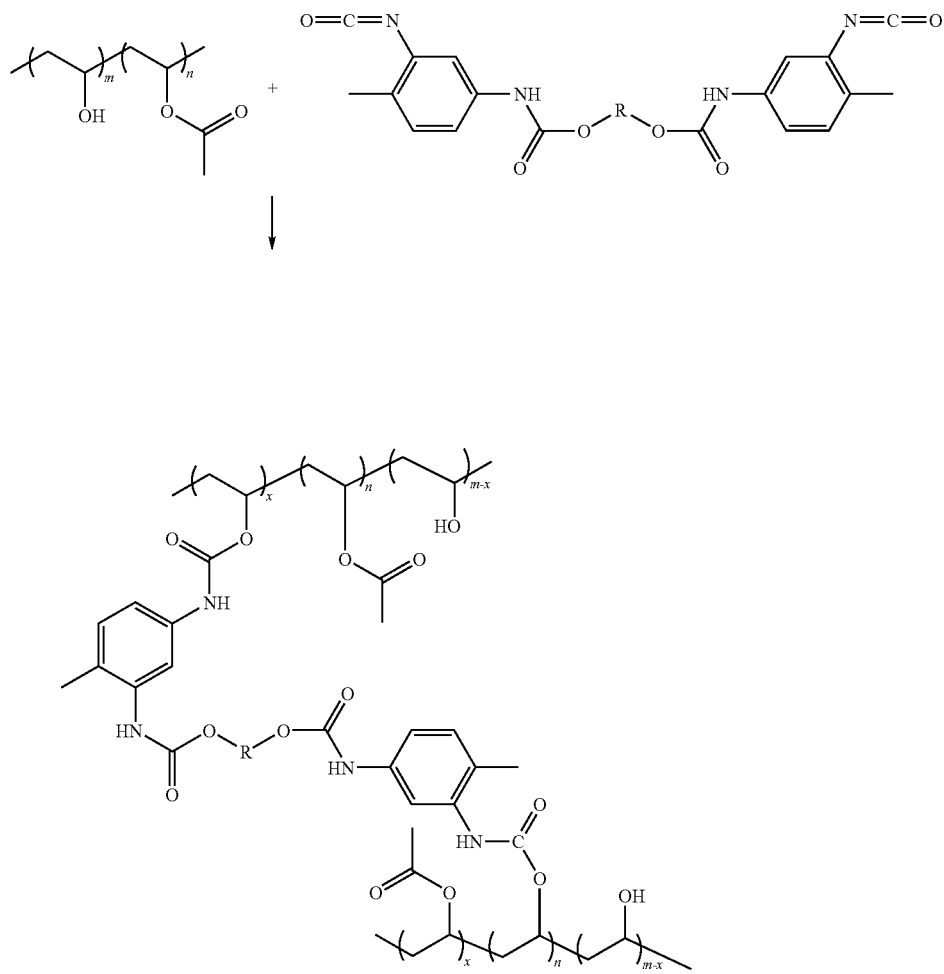

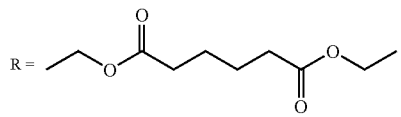

EXAMPLE 13

This example, reaction depicted below, illustrates a degradable viscosifier, in accordance with an embodiment of the present invention, that may be obtained by copolymerization of an acrylic monomer, the "A" polymer, such as acrylic acid CAS 79-10-7 or the like, with a "B" building block, such as (poly(ethyleneglycol) bismethacrylate) CAS 2585-47-45 with a molecular weight of 875 Da or the like (that can be purchased from Sigma-Aldrich, UK code 437-468) yielding a copolymer containing several degradable ester links. In accordance with an embodiment of the present invention, the copolymer may be used to form a high viscosity gel in an aqueous solvent.

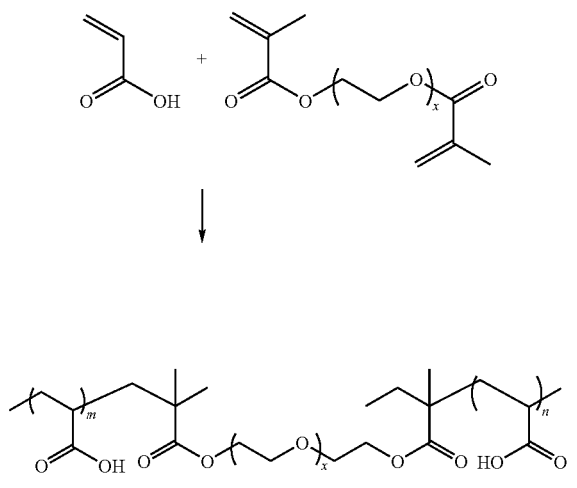

EXAMPLE 14

This example, reaction depicted below, illustrates a degradable viscosifier, in accordance with an embodiment of the present invention, that may be obtained by copolymerization of an acrylic monomer, such as acrylamide CAS 79-06-1, the "A" polymer, with a "B" building block, such as (poly(ethyleneglycol) bismethacrylate) CAS 2585-47-45 molecular weight 875 Da (that may be purchased from Sigma-Aldrich, UK code 437-468) or the like, yielding a copolymer containing several degradable ester links. In accordance with an embodiment of the present invention, the copolymer may form a high viscosity gel in an aqueous solvent.

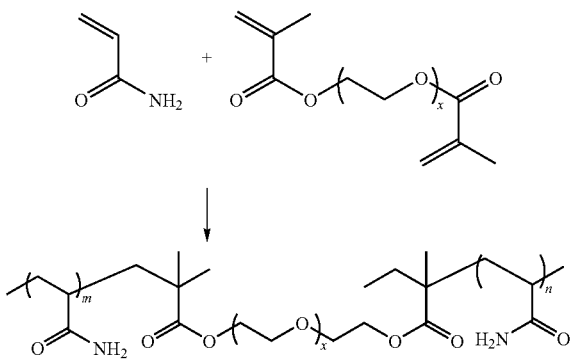

EXAMPLE 15

This example, reaction depicted below illustrates a degradable viscosifier, in accordance with an embodiment of the present invention, that may be obtained by copolymerization of a sodium styrene sulfonic acid salt CAS 304675-74-9 copolymer, the "A" polymer, with a "B" building block, such as (poly(ethyleneglycol) bismethacrylate) CAS 2585-47-45 molecular weight 875 Da (that may be purchased from Sigma-Aldrich, UK code 437-468) or the like, yielding a copolymer containing several degradable ester links. The copolymer may be used to form a high viscosity gel in an aqueous solvent.

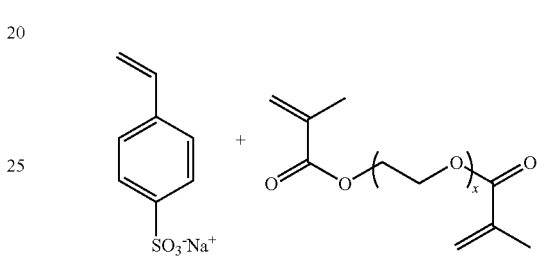

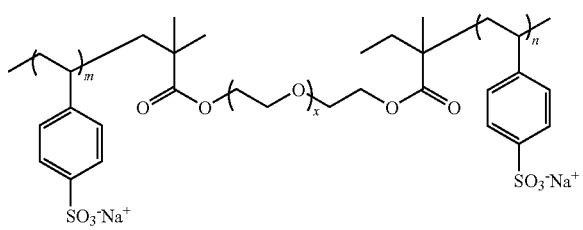

EXAMPLE 16

This example, reaction depicted below, illustrates a degradable viscosifier, in accordance with an embodiment of the present invention, that may be obtained by copolymerization of a sodium styrene sulfonic acid salt CAS 304675-74-9, and glycidylmethacrylate CAS 106-91-2 copolymer, collectively the "A" polymer, with a "B" building block, such as Tris(aminoethyl)amine CAS 4097-89-6 or the like, to yield a copolymer containing several degradable ester links. The copolymer, in accordance with an embodiment of the present invention, may be used to form a high viscosity gel in an aqueous solvent.

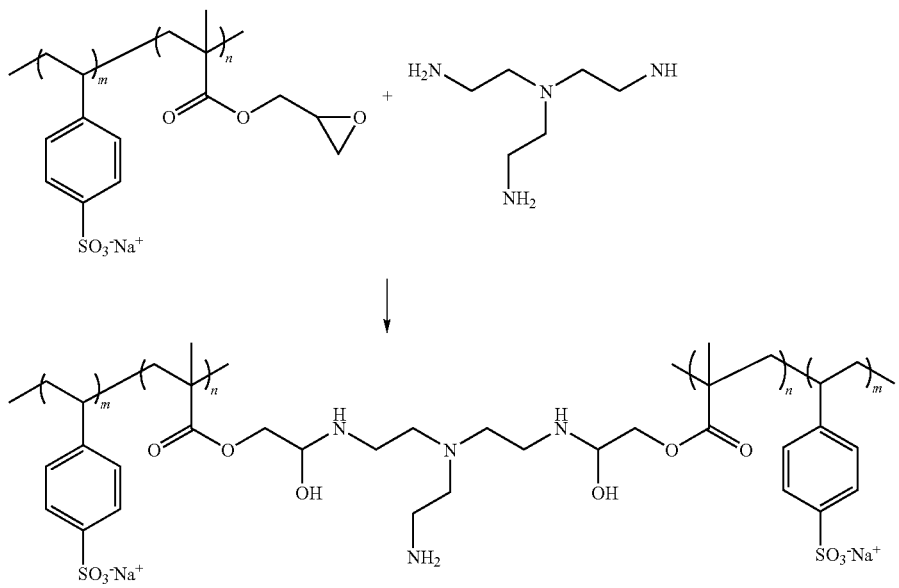

EXAMPLE 17

This example, reaction depicted below, illustrates a degradable viscosifier, in accordance with an embodiment of the present invention, that may be obtained by copolymerization of a acrylic acid CAS 79-10-7, the "A" polymer, with a "B building block", such as dihydroxyethylene bisacrylamide CAS 868-63-3 or the like, to yield a copolymer containing several degradable amide links. The copolymer, in accordance with an embodiment of the present invention, may be used to form a high viscosity gel in an aqueous solvent.

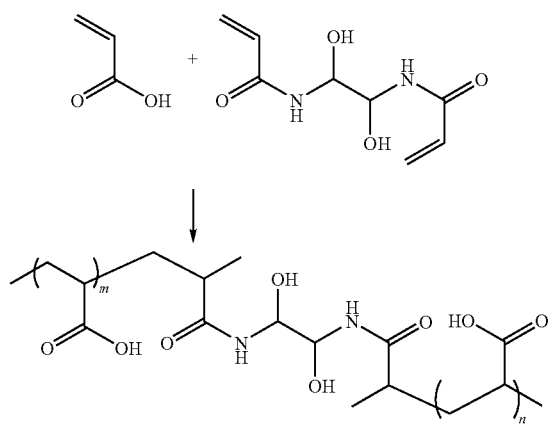

EXAMPLE 18

This example, reaction depicted below, illustrates a degradable viscosifier, in accordance with an embodiment of the present invention, that may be obtained by copolymerization of an acrylamide CAS 79-06-1, the "A" polymer, with a "B building block", such as dihydroxyethylene bisacrylamide CAS 868-63-3 or the like, yielding a copolymer containing several degradable amide links. The copolymer may be used to form a high viscosity gel in an aqueous solvent at adequate pH.

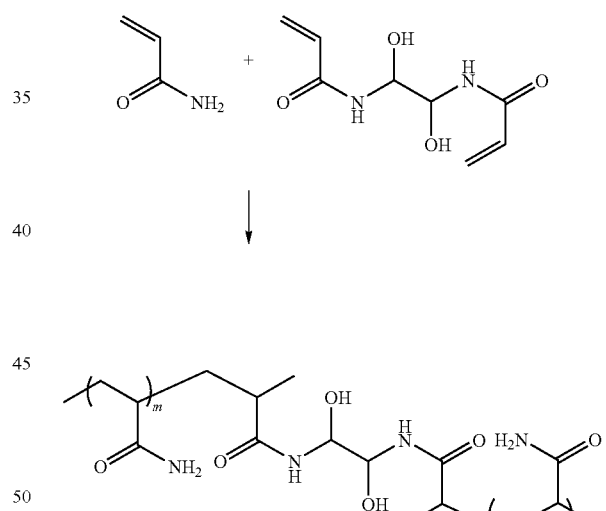

EXAMPLE 19

This example, reaction depicted below, illustrates a degradable viscosifier, in accordance with an embodiment of the present invention, that may be obtained by reaction of a copolymer made of glycidyl methacrylate CAS 106-91-2 and sodium styrene sulfonic acid salt CAS 304675-74, the "A" polymer, with a "B building block", such as hexamethylenediamine CAS 124-09-4 yielding a copolymer containing several degradable ester links. The copolymer may be used, in accordance with an embodiment of the present invention, to form a high viscosity gel in an aqueous solvent.

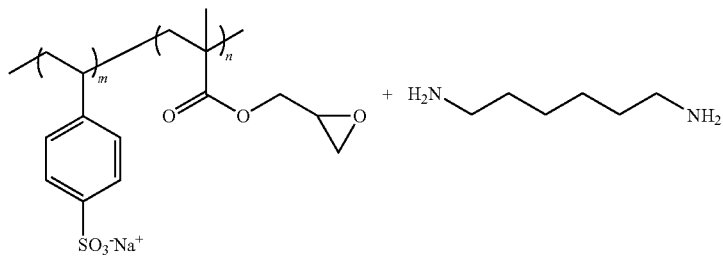

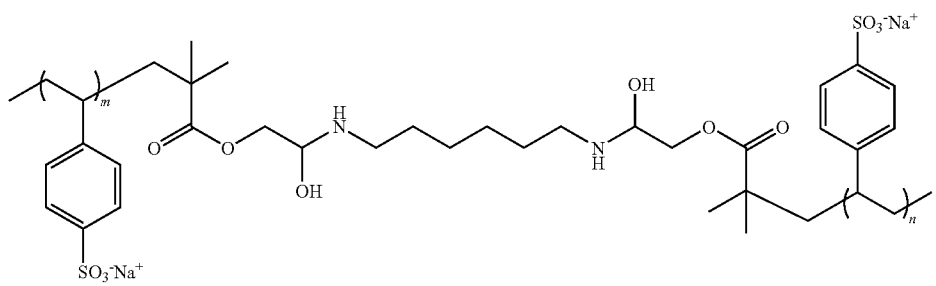

EXAMPLE 20

This example, reaction depicted below, illustrates a degradable viscosifier, in accordance with an embodiment of the present invention, that may be obtained by reaction in a suitable organic solvent of a copolymer containing maleic anhydride CAS 108-31-6—such as the poly(ethylene-alt-maleic anhydride) CAS 9006-26-2, molecular weight 100000-500000 Da (that may be purchased from Sigma-Aldrich UK, under code 188050) or the like—the "A" polymer, with Tris (aminoethyl)amine CAS 4097-89-6, the "B building block", yielding a copolymer containing several degradable amide links. The copolymer, in accordance with an embodiment of the present invention, may be used to form a high viscosity gel in an alkaline aqueous solvent.

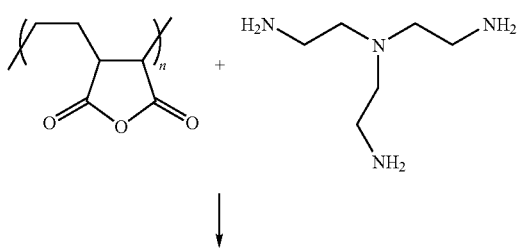

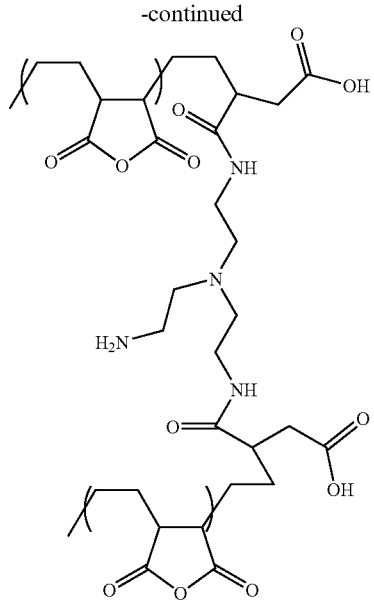

EXAMPLE 21

This example, reaction depicted below, illustrates a degradable viscosifier, in accordance with an embodiment of the present invention, that may be obtained by reaction in a suitable organic solvent of a graft copolymer containing maleic anhydride CAS 108-31-6, such as the poly(ethylene-graft-maleic anhydride) CAS 106343-08-2 (that may be purchased from Sigma-Aldrich UK, under code 437204) or the like, the "A" polymer, with tris(aminoethyl)amine CAS 4097-89-6, the "B building block", yielding a copolymer containing several degradable amide links.

The copolymer may be used to form a high viscosity gel in an alkaline aqueous solvent.

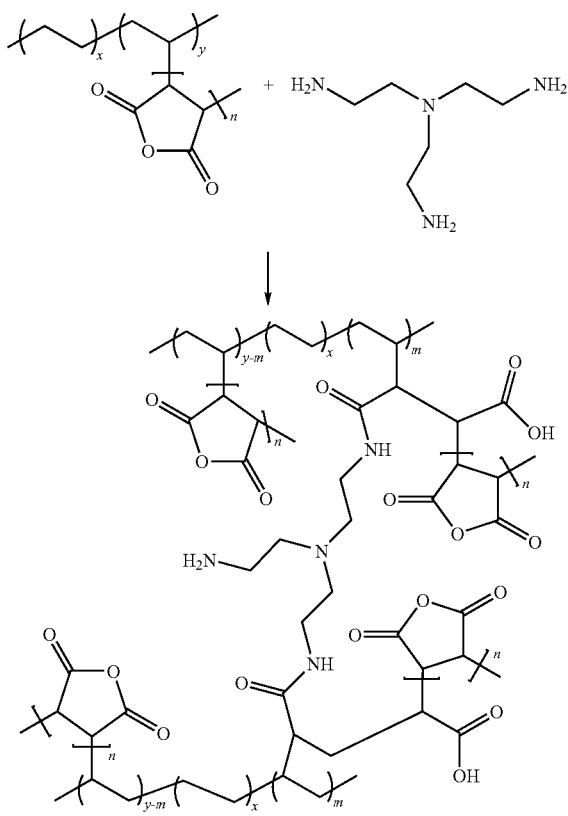

In the foregoing description, for the purposes of illustration, various methods and/or procedures were described in a particular order. It should be appreciated that in alternate embodiments, the methods and/or procedures may be performed in an order different than that described.

Hence, while detailed descriptions of one or more embodiments of the invention have been given above, various alternatives, modifications, and equivalents will be apparent to those skilled in the art without varying from the spirit of the invention. Moreover, except where clearly inappropriate or otherwise expressly noted, it should be assumed that the features, devices and/or components of different embodiments may be substituted and/or combined. Thus, the above description should not be taken as limiting the scope of the invention, which is defined by the appended claims.

What is claimed is:

1. An aqueous wellbore fluid which is a hydraulic fracturing fluid comprising a viscosifying agent comprising a polymer formed through copolymerization of at least two pre-polymers "A" and "B", wherein the copolymer chain contains bonds within subchains formed from pre-polymer "B" or between prepolymers "A" and "B" which said bonds are selectively degradable relative to bonds within subchains formed from prepolymer "A", so that said polymer degrades into soluble fragments after initiation of a breaking process.

2. The wellbore fluid of claim 1, wherein at least one of the at least two pre-polymers "A" and "B" is synthetic.

3. The wellbore fluid of claim 1, wherein at least one of the at least two pre-polymers "A" and "B" is hydrophobically modified.

4. The wellbore fluid of claim 1, wherein the at least two pre-polymers "A" and "B" are not oxidized polysaccharides.

5. The wellbore fluid of claim 1, wherein subchains of the pre-polymer "A" provide more than 50% of the molecular mass of the polymer.

6. The wellbore fluid of claim 1, wherein the largest of the soluble fragments are subchains formed by single pre-polymer "A" molecules.

7. The wellbore fluid of claim 1, wherein subchains formed by pre-polymer "A" are soluble.

8. The wellbore fluid of claim 1, wherein the soluble fragments are subchains formed by the pre-polymers "A" and "B" or the pre-polymer "A" linked to fragments of "B".

9. The wellbore fluid of claim 1, wherein the breaking process is induced by a process selected from a group consisting of altering pH conditions, temperature and electrochemical potentials.

10. The wellbore fluid of claim 1, wherein the soluble fragments are soluble in the same base solvent as the polymer.

11. An aqueous wellbore fluid comprising a viscosifying agent comprising a polymer formed through copolymerization of at least two pre-polymers "A" and "B", wherein the copolymer chain contains bonds within subchains formed from pre-polymer "B" or between prepolymers "A" and "B" which said bonds are selectively degradable relative to bonds within subchains formed from prepolymer "A", so that said polymer degrades into soluble fragments after initiation of a breaking process,
wherein the viscosifying agent is present in the wellbore fluid at, or above concentrations required to form a space-filling gel, but after the breaking process the soluble fragments are present in a downhole solution below their respective concentration required to form a space-filling gel.

12. The wellbore fluid of claim 1, wherein the pre-polymers "A" and "B" are copolymerized using addition or condensation reactions between terminal groups of pre-polymer "A" and/or pre-polymer "B".

13. The wellbore fluid of claim 1, wherein link regions between subchains formed by the pre-polymers "A" and "B" in the polymer are free of organo-metallic bonds.

14. The wellbore fluid of claim 1, wherein the pre-polymer "B" has only two terminal functional groups.

15. The wellbore fluid of claim 1, wherein the pre-polymer "B" comprises three or more degradable bonds.

16. The wellbore fluid of claim 1, wherein the polymer is formed by coupling at least one pre-polymer "A" to at least one pre-polymer "B" containing at least one selectively degradable bond selected from a group consisting of the following bonds:
covalent bonds that can be degraded by a hydrolytic mechanism by means of acids, encapsulated acids, acid precursors, bases, encapsulated bases, base precursors;
chemical bonds that can be homolytically cleaved for example by means of a redox reaction triggered by the release of a reducing agent; and
bonds that can be enzymatically degraded by means of specific enzymes.

17. The wellbore fluid of claim 1, wherein the pre-polymer "A" contains functional groups selected from the group consisting of hydroxy (—OH) functional groups, amino (—NH$_2$) functional groups, aldehyde (—CH=O) functional groups, formyl (—CH=O) functional groups, epoxy functional groups, ester functional groups, anhydride functional groups, carboxylic acid functional groups, carboxylic acid chloride functional groups and amide (—CO—NH$_2$) functional groups.

18. The wellbore fluid of claim 1, wherein the pre-polymer "A" contains terminal groups selected from the group consisting of hydroxy (—OH) terminal groups, amino (—NH$_2$) terminal groups, aldehyde (—CH=O) terminal groups, formyl (—CH=O) terminal groups, epoxy terminal groups, ester terminal groups, anhydride terminal groups, a carboxylic acid terminal groups, carboxylic acid chloride terminal groups and amide (—CO—NH$_2$) terminal groups.

19. The wellbore fluid of claim 1, wherein the pre-polymer "B" is free of organometallic bonds.

20. The wellbore fluid of claim 11, wherein the link between the pre-polymers "A" and "B" is enabled by a bridge pre-polymer "C".

21. The wellbore fluid of claim 1, wherein the link between the pre-polymers "A" and "B" is enabled by an organic bridge pre-polymer "C".

22. The wellbore fluid of claim 11, wherein the wellbore fluid is an aqueous or an organic fluid used as at least one of a fracturing fluid, a drilling fluid, a diverting fluid, a gravel packing fluid and a fluid loss control pill.

23. A wellbore fluid comprising a viscosifying agent comprising a copolymer formed through copolymerization of at least two pre-polymers "A" and "B", wherein subchains provided by the pre-polymer "A" provide more than 50% of the molecular mass of the polymer and wherein after initiation of a breaking process the polymer degrades into soluble fragments which include soluble subchains provided by the pre-polymer "A".

24. The fluid of claim 23, wherein the largest of the soluble fragments are subchains formed by single pre-polymer "A" molecules.

25. The wellbore fluid of claim 11, wherein the largest of the soluble fragments are subchains formed by single pre-polymer "A" molecules.

26. A viscosifying agent for wellbore fluids comprising a polymer formed through copolymerization of at least two pre-polymers "A" and "B", wherein subchains of the pre-polymer "A" provide more than 50% of the molecular mass of the polymer and wherein the copolymer chain contains bonds within subchains formed from pre-polymer "B" or between prepolymers "A" and "B" which said bonds are selectively degradable relative to bonds within subchains formed from prepolymer "A", so that said polymer degrades into soluble fragments after initiation of a breaking process.

* * * * *